United States Patent [19]
Yokota et al.

[11] Patent Number: 5,692,227
[45] Date of Patent: Nov. 25, 1997

[54] VIEWFINDER

[75] Inventors: Hidetaka Yokota, Tokyo; Tetsuya Abe, Hokkaido; Sachio Hasushita, Tokyo, all of Japan

[73] Assignee: Asahi Kogaku Kogyo Kabushiki Kaisha, Tokyo, Japan

[21] Appl. No.: 221,789

[22] Filed: Apr. 1, 1994

[30] Foreign Application Priority Data

Apr. 5, 1993 [JP] Japan ................ 5-016679 U
Apr. 22, 1993 [JP] Japan ................ 5-021026 U

[51] Int. Cl.$^6$ .............. G03B 13/02; G03B 13/18; G03B 3/00
[52] U.S. Cl. .............. 396/377; 396/149; 396/378; 396/379; 396/382
[58] Field of Search ................ 354/221, 222, 354/223, 400, 402, 199; 396/140, 149, 377-379, 382

[56] References Cited

U.S. PATENT DOCUMENTS

| 4,924,247 | 5/1990 | Suzuki et al. . |
| 4,992,809 | 2/1991 | Nozaki et al. . |
| 5,052,787 | 10/1991 | Sugawara . |
| 5,117,247 | 5/1992 | Nakai et al. ............... 354/222 |
| 5,142,312 | 8/1992 | Suzuki et al. . |
| 5,160,954 | 11/1992 | Suzuki et al. . |
| 5,162,946 | 11/1992 | Yamaguchi ............... 359/676 |
| 5,193,030 | 3/1993 | Nozaki et al. . |
| 5,200,774 | 4/1993 | Nakajima ............... 354/62 |
| 5,309,286 | 5/1994 | Abe et al. . |
| 5,321,460 | 6/1994 | Yoshida ............... 354/403 |
| 5,335,030 | 8/1994 | Suzuka ............... 354/149.1 |
| 5,381,205 | 1/1995 | Kotani et al. ............... 354/400 |

FOREIGN PATENT DOCUMENTS 3196030 6/1991 Japan .
3267928 11/1991 Japan .

*Primary Examiner*—Safet Metjahic
*Assistant Examiner*—Michael Dalakis
*Attorney, Agent, or Firm*—Greenblum & Bernstein P.L.C.

[57] ABSTRACT

A camera viewfinder having a plurality of lens groups, wherein a photographing optical system of the camera is separate from the viewfinder. The viewfinder includes a parallax error compensating and diopter adjusting lens group which is one of the plurality of lens groups. The viewfinder further includes a guide member for guiding the compensating and adjusting lens group in a direction that intersects the optical axis of the viewfinder so as to move the lens group towards and away from the optical axis of the photographing optical system. In addition, there is provided an object distance detecting mechanism for detecting a distance of an object to be photographed, and a movement control mechanism for continuously moving the parallax error compensating and diopter adjusting lens group along the guide member in accordance with the object distance detected by the object distance detecting mechanism.

40 Claims, 23 Drawing Sheets

OBJECT SIDE

OBJECT SIDE

B= 0.000
HH= 0.000

B= -6.300
HH= 72.668

B= -9.400
HH= 106.696

B= -11.000
HH= 123.569

B= 0.000
HH= -28.000

B= -6.300
HH= 199.870

B= -9.400
HH= 319.633

B= -11.000
HH= 383.726

B= 6.300
HH= -260.154

B= 9.400
HH= -386.185

B= 11.000
HH= -455.647

B= 0.001
HH= -28.000

B= -6.300
HH= 42.762

B= -9.400
HH= 75.459

B= -11.000
HH= 91.510

B= 6.300
HH= -99.239

B= 9.400
HH= -132.478

B= 11.000
HH= -148.808

B= 0.000
HH= 0.000

B= -6.300
HH= 258.442

B= -9.400
HH= 401.590

B= -11.000
HH= 484.843

B= 0.000
HH= 0.000

B= -6.300
HH= 83.689

B= -9.400
HH= 122.201

B= -11.000
HH= 141.039

−0.20  B= 0.000
HH= −28.000
+0.20

−0.20  B= −6.300
HH= 229.971
+0.20

−0.20  B= −9.400
HH= 369.073
+0.20

−0.20  B= −11.000
HH= 448.188
+0.20

−0.20  B= 6.300
HH= −294.888
+0.20

−0.20  B= 9.400
HH= −449.490
+0.20

−0.20  B= 11.000
HH= −543.708
+0.20

-0.20  B= 0.001
HH= -28.000
+0.20

-0.20  B= -6.300
HH= 56.484
+0.20

-0.20  B= -9.400
HH= 95.027
+0.20

-0.20  B= -11.000
HH= 113.714
+0.20

-0.20  B= 6.300
HH= -113.324
+0.20

-0.20  B= 9.400
HH= -152.859
+0.20

-0.20  B= 11.000
HH= -172.177
+0.20

VIEWFINDER

BACKGROUND OF THE INVENTION

1. Field of the Invention

The present invention relates to an improved viewfinder of a camera having a finder optical system and a photographing optical system separate from the viewfinder. More precisely, it relates to a viewfinder in which a parallax error can be compensated and/or a dioptric power adjustment can be made in accordance with a variation in object distance.

The present invention also relates to a method for carrying out the parallax error compensation and the diopter power adjustment of a viewfinder in a camera as mentioned above.

2. Description of Related Art

In a camera having a photographing optical system and a finder optical system provided separate from the photographing optical system, the optical axis of the photographing optical axis is generally coincident with that of the finder optical axis only at a predetermined distance from the camera. Due to this fact, in most cases, the center of the field of view of the viewfinder does not coincide with that of the photographing area on a film, resulting in a parallax error. In a camera having this parallax problem, even when the photographer frames an object to be photographed at the center of the field of view of the viewfinder, assuming that the object will be photographed at the center of the photographing area on a film, the object to be photographed will not be centered on the photographing area on the film.

To compensate for the parallax error due to the disagreement between the field of view of the finder and the photographing area of a film, a single compensating frame or a plurality of compensating frames is provided within the viewfinder in conventional cameras. A photographer recognizes the field of view defined by the compensating frame(s) as the photographing area of a film in accordance with the object distance, and frames the object to be photographed within the field of view.

However, in the known parallax error compensating method using the compensating frame(s), it is necessary for the photographer to visually confirm the field of view defined by the compensating frame(s). This is quite troublesome and sometimes results in a failure to compensate for the parallax error. Further, it is impossible to compensate for the parallax error for all object distances. Namely, since the finder field of view defined by the compensating frame(s) corresponds only to the actual photographing image area at the reference object distance, the field of view defined by the compensating frame(s) does not agree with the photographing image area at object distances other than the reference object distance. If deviation of the field of view from the photographing image area occurs, the photographer must take a picture, taking the deviation into account. Nevertheless, if the deviation predicted by the photographer is incorrect, the intended composition cannot be obtained.

In the above-mentioned type of camera, in general, the dioptric power of the finder is about −1 Dpt at a specific object distance (i.e., reference object distance of 3 meters, for example), so that an image of an object which is 3 meters from the camera is formed at a distance of 1 meter. Consequently, for an object at an object distance other than the reference object distance, the diopter is deviated from −1 Dpt. Namely, an image of an object located at an object distance other than 3 meters is not formed at a distance of 1 meter. Accordingly, it is necessary for the photographer to adjust his or her eyes in order to observe a clear image of an object at an object distance other than 3 meters. This increases a burden on the photographer's eyes. In addition, if the photographer fails to correctly adjust his or her eyes, a clear image cannot be viewed.

SUMMARY OF THE INVENTION

It is an object of the present invention to provide a viewfinder in which the finder field of view is always coincident with the photographing image area so that a picture having an intended composition can be taken, and a diopter corresponding to an object distance is obtained in which the stress on a photographer's eyes is minimized.

Another object of the present invention is to provide an apparatus in which if a parallax error or a deviation in diopter occurs, the parallax error or diopter deviation can be effectively compensated prior to the photographing operation. Namely, the present invention is aimed at a realization of a camera in which parallax error or diopter deviation can be eliminated when the photographer determines the picture composition while observing an object image through the viewfinder, even before a shutter button is actuated.

According to the present invention, there is provided a camera viewfinder having a plurality of lens groups, wherein a photographing optical system of the camera is separate from the viewfinder. The viewfinder includes a parallax error compensating and diopter adjusting lens group which is one of the plurality of lens groups. Preferably, the compensating and diopter adjusting lens group is the lens group that has the least influence on the magnification and aberrations of the whole photographing optical system when moved in the orthogonal directions, i.e., the optical axis direction and the direction normal to the optical axis direction. The viewfinder further includes a guide member for guiding the parallax error compensating and diopter adjusting lens group in a direction that intersects the optical axis of the viewfinder so as to move the lens group towards and away from the optical axis of the photographing optical system. There is further provided an object distance detecting mechanism for detecting a distance of an object to be photographed, and a movement control mechanism for continuously moving the compensating and adjusting lens group along the guide member in accordance with the object distance detected by the object distance detecting mechanism.

When the object is located at a predetermined finite reference distance, the parallar eror compensating and diopter adjusting lens group is moved to a reference position in which a parallax error does not exist, and in which the diopter of the finder is a reference diopter.

In an embodiment of the invention, the compensating lens group has a positive power and the guide member is inclined with respect to the optical axis of the finder so as to move the compensating and adjusting lens group from the reference position in the directions towards and away from the object, and towards and away from the optical axis of the photographing optical system, respectively. The movement control mechanism moves the compensating and adjusting lens group towards the object and the optical axis of the photographing optical system when the object distance is shorter than the reference distance, and moves the compensating and adjusting lens group away from the object and the optical axis of the photographing optical system when the object distance is longer than the reference distance, respectively.

In another embodiment of the invention, the compensating and adjusting lens group has a negative power and the guide member is inclined with respect to the optical axis of the finder so as to move the compensating and adjusting lens group from the reference position in a direction towards the object and away from the optical axis of the photographing optical system, or in a direction away from the object and towards the optical axis of the photographing optical system. The movement control mechanism moves the compensating and adjusting lens group towards the object and away from the optical axis of the photographing optical system when the object distance is shorter than the reference distance, and moves the compensating and adjusting lens group away from the object and towards the optical axis of the photographing optical system when the object distance longer than the reference distance, respectively.

Preferably, a repetitive measuring mechanism is provided for repeatedly actuating the object distance detecting mechanism at predetermined time intervals. A lens driving mechanism is provided for moving the compensating and adjusting lens group along the guide member in a direction that compensates parallax error and adjusts the diopter every time the object distance is detected by the object distance detecting mechanism.

Also, a compensation commencing mechanism, which is actuated to commence the compensating for parallax error and adjusting of the diopter, is provided. The repetitive measuring mechanism is actuated by the operation of the compensation commencing mechanism.

The compensation commencing mechanism can be realized by an existing main switch of the camera, or an existing grip sensor provided on a grip portion of the camera. Preferably, the detection of object distance by the object distance detecting mechanism is carried out by the compensation commencing mechanism, independently of a shutter release button of the camera.

According to another aspect of the present invention, there is provided a method for compensating for parallax error and effecting a diopter adjustment of a viewfinder in a camera having a photographing optical system separate from the viewfinder. The viewfinder includes a plurality of lens groups. The method is carried out by selecting a viewfinder lens group that has the least influence on the magnification and aberrations of the whole photographing optical system when moved in the orthogonal directions, including the optical axis direction and the direction normal thereto. This lens group is then used as a parallax error compensating and diopter adjusting lens group. The method further includes the steps of detecting a distance of an object to be photographed by an object distance detecting mechanism, and continuously moving the compensating lens group in accordance with the object distance detected by the object distance detecting mechanism in directions intersecting the optical axis of the finder, and away from and towards the optical axis of the photographing optical system to compensate parallax error and adjust the diopter.

According to still another aspect of the present invention, there is provided a viewfinder of a camera having a photographing optical system separate from the viewfinder, including an object distance detecting means for detecting a distance of an object to be photographed, a compensation commencing mechanism for commencing the detection of object distance by the object distance detecting mechanism at a predetermined time independent of a shutter release of the camera, a parallax error compensating lens group which is provided on the finder to continuously move, and a movement control mechanism for continuously moving the parallax error compensating lens group in a direction to eliminate the parallax error every time the object distance is detected by the object distance detecting mechanism.

According to still another aspect of the present invention, there is provided a viewfinder of a camera having a photographing optical system separate from the viewfinder, including an object distance detecting mechanism for detecting a distance of an object to be photographed, a compensation commencing mechanism for commencing the detection of the object distance by the object distance detecting mechanism at a predetermined time independent of a shutter release of the camera, a diopter adjusting lens group which is provided on the finder to continuously move, and a movement control mechanism for continuously moving the diopter adjusting lens group in a direction to eliminate a deviation of the diopter every time the object distance is detected by the object distance detecting mechanism.

The present disclosure relates to subject matter contained in Japanese utility model applications No. 5-16679 (filed on Apr. 5, 1993) and No. 5-21026 (filed on Apr. 22, 1993) which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENT

Figure 1:
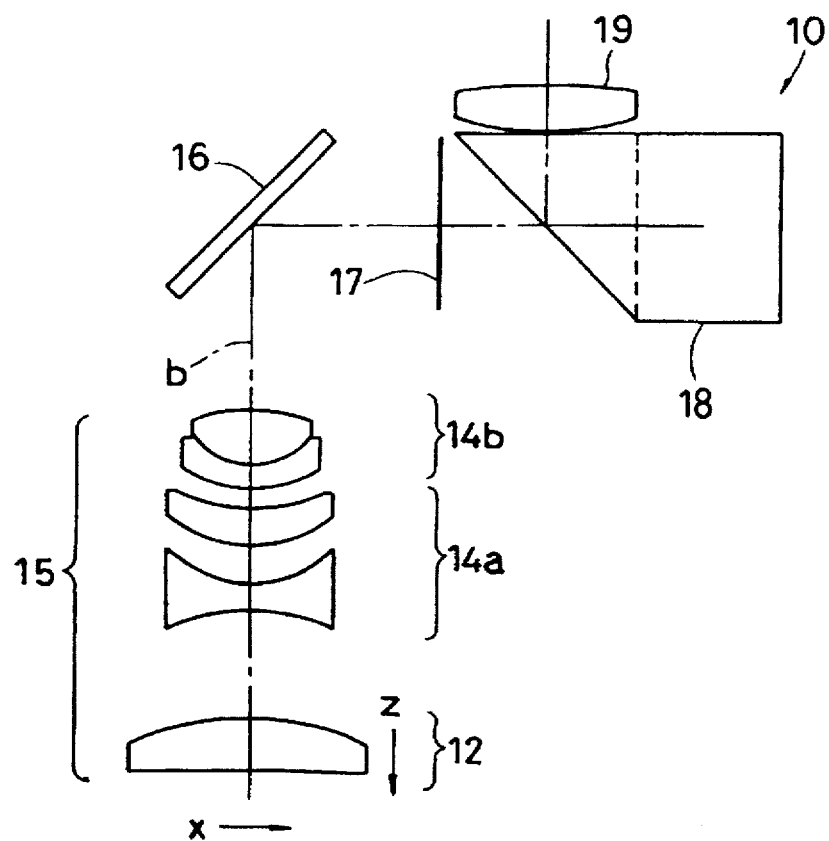
FIG. 1 is a plan view of a finder optical system according to the present invention.
Figure 2:
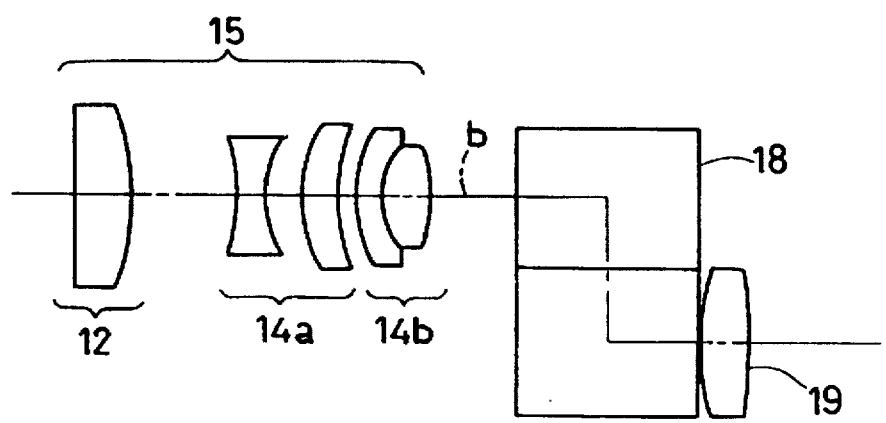
FIG. 2 is a side elevational view of a finder optical system according to the present invention.

In FIGS. 1 and 2, a finder optical system provided in a camera body is generally indicated at 10. The finder optical system 10 includes a first lens group 12, a second lens group 14a provided optically behind the first lens group 12, and a third lens group 14b provided optically behind the second lens group 14a. The first, second and third lens groups constitute an objective lens group 15. The magnification and aberration of the whole finder optical system are negligibly influenced by the movement of the first lens group 12 in a direction z parallel with the optical axis "b" of the finder optical system. Furthermore, the movement of the first lens group 12 in a direction x perpendicular to the optical axis "b" causes a negligible deterioration of the aberration of the whole finder optical system.

Behind the objective lens group 15, there are provided a reflecting mirror 16, a focusing plate 17, a prism 18 having three reflecting surfaces, and an eyepiece lens 19. These optical elements constitute, together with the objective lens group 15, a real image type of finder optical system 10.

The camera body B (FIG. 3) is additionally provided with a photographing optical system 11 above which the first lens group 12 is located. There is a lens driving means 13 in the vicinity of the first lens group 12.

The first lens group 12 is a compensating or correcting lens group which compensates the parallax error and makes a corresponding diopter adjustment. The first lens group 12 is secured to and within a lens frame 20 which is provided with a cylindrical slider 21 integral therewith, that is slidably supported on and along a guide rod (shaft) 22 to move the first lens group 12 in a diagonal direction with respect to the optical axis "b" of the finder optical system 10. Namely, the axis of the guide rod 22 extends in an oblique direction with respect to the optical axis "b" The lens frame 20 is supported by another guide member (not shown) to linearly move without rotating.

Figure 3:
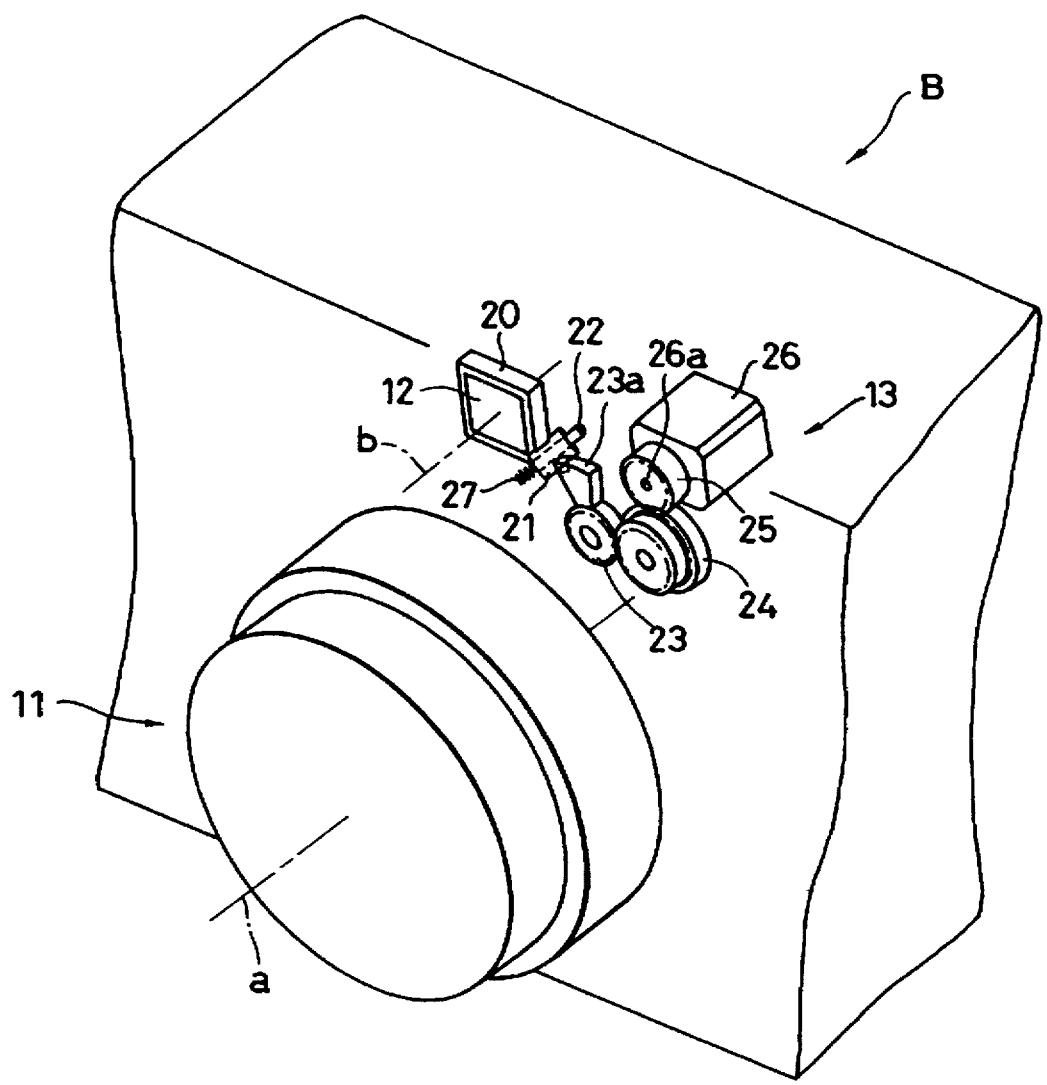
FIG. 3 is a partial perspective view of a lens driving means in a camera to which the present invention is applied.

The slider 21 is biased rearwardly by a coil spring 27, as shown in FIG. 3, so that a guide piece 21a (FIG. 4) projecting from the side surface of the slider 21 abuts against a cam surface of a cam 23a to thereby determine the position thereof.

Figure 4:
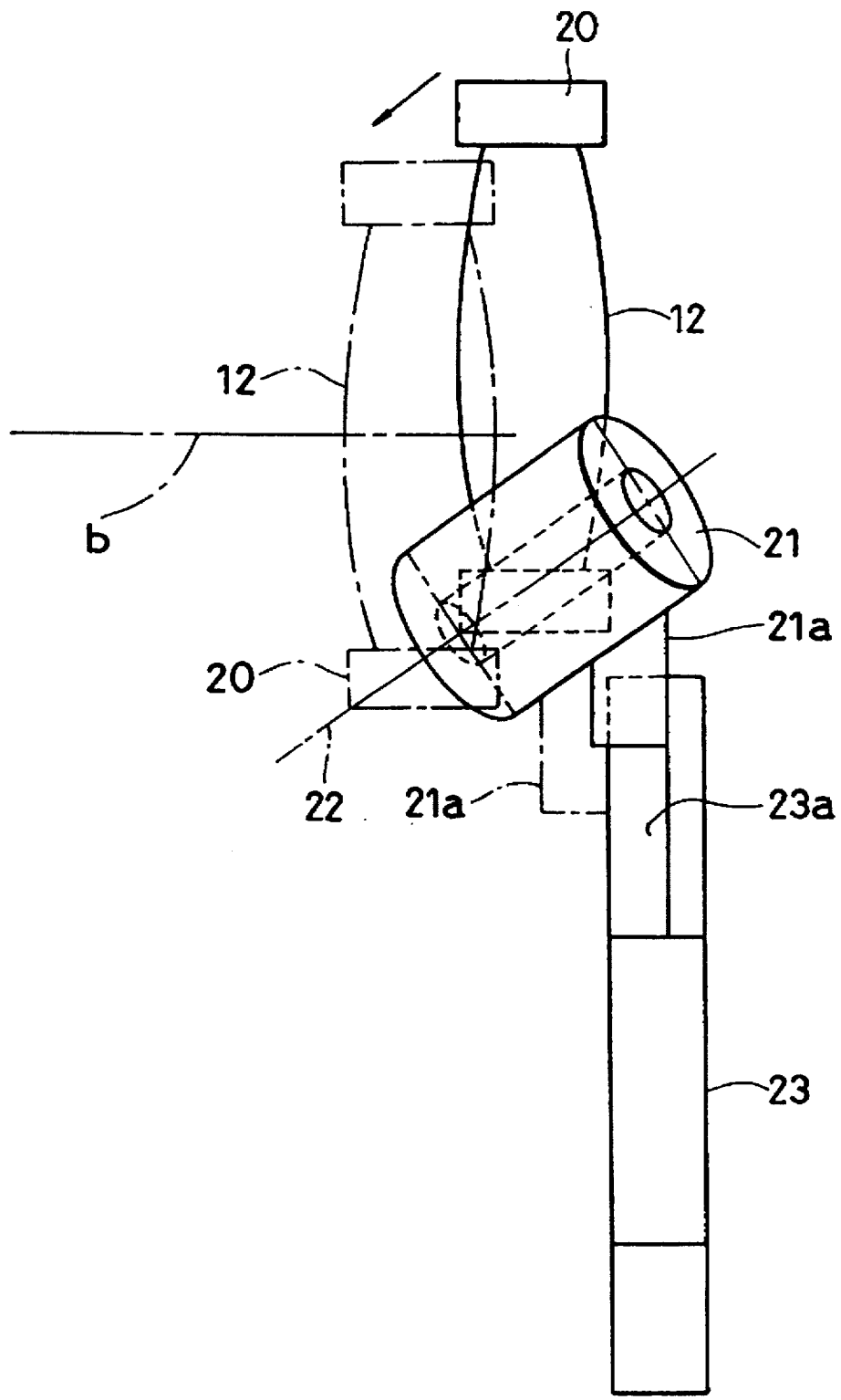
FIG. 4 is an explanatory view of a first lens group which is moved by a linear guide mechanism.

The cam 23a is in a wedge shape and has a thickness varying in the circumferential direction. When the cam 23a rotates, the contact point (or contact surface) of the cam 23a and the guide piece 21a changes in the direction of the axis of the guide rod 22. Consequently, the slider 21 and the first lens group 12 are moved along the guide rod 22 by the rotation of the cam 23a as can be seen in FIG. 4. The cam 24 is secured to a peripheral surface of a gear 24 which is connected to a pulse motor 26 through a gear 24 and a pinion 25, so that the cam 23a can be rotated by the pulse motor 26.

The slider 21, the cam 23a, the gear 24, the pinion 25, and the pulse motor 26 constitute a lens driving means 13.

Figure 5:
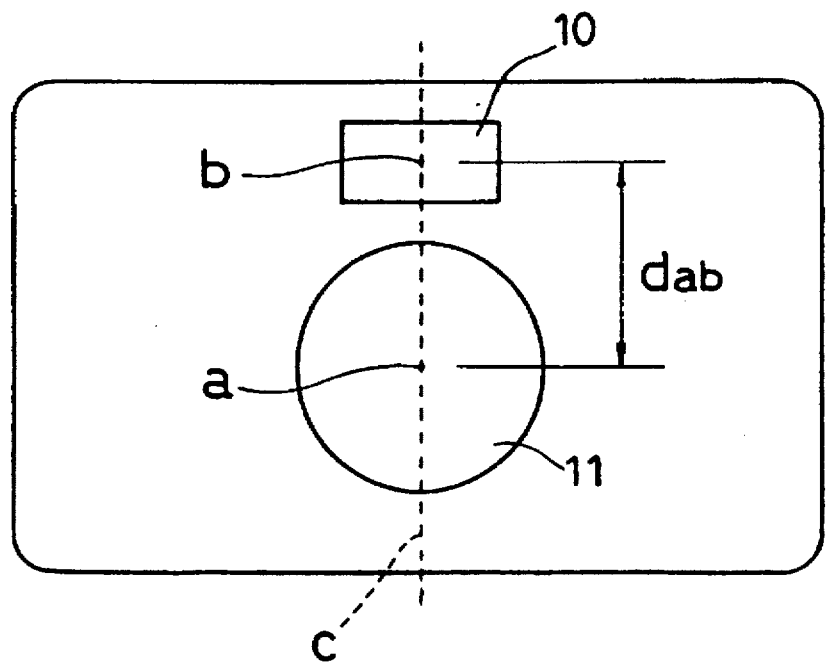
FIGS. 5 and 6 are front elevational views of two different positions of an optical axis of a photographing optical system and an optical axis of a finder optical system.
Figure 6:
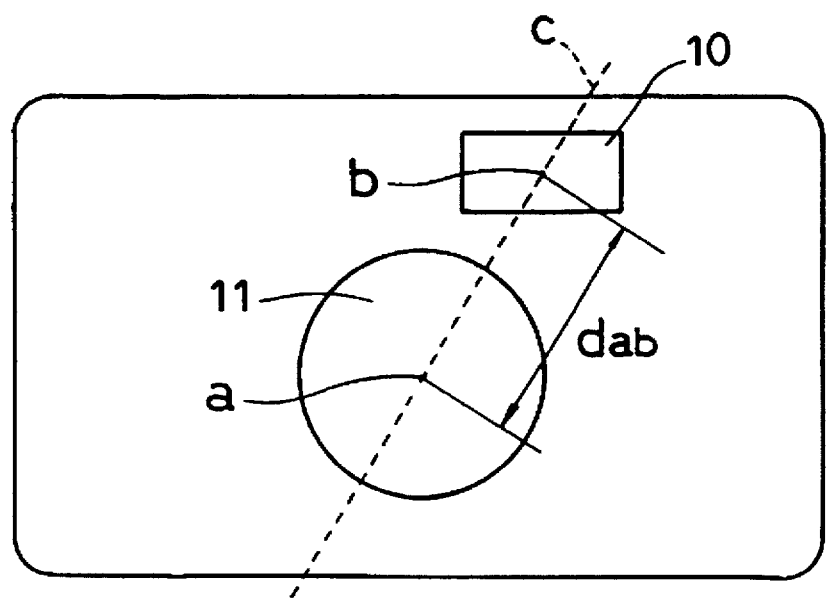
Figure 11A:
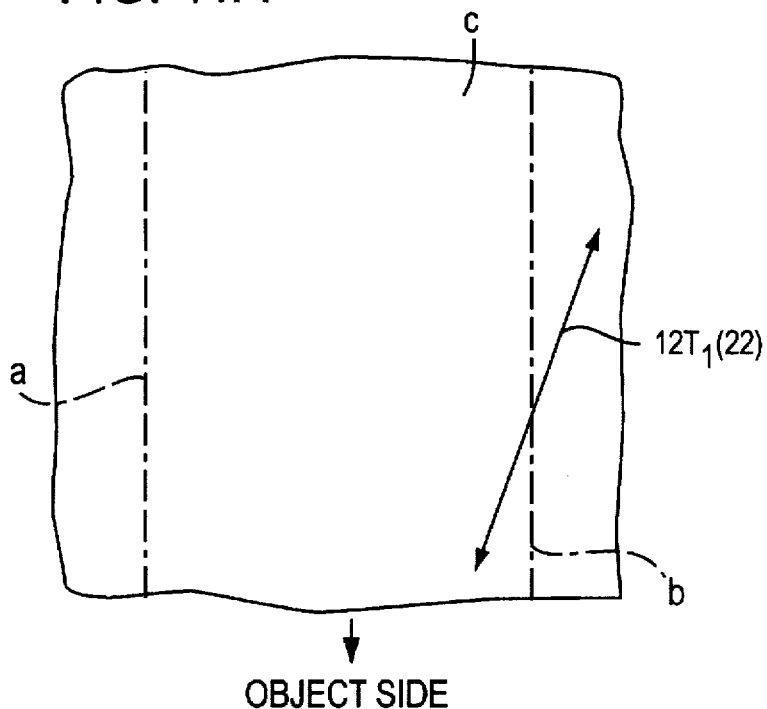
FIGS. 11A and 11B are views showing a direction of movement of the correcting lens of a finder according to the present invention.
Figure 11B:
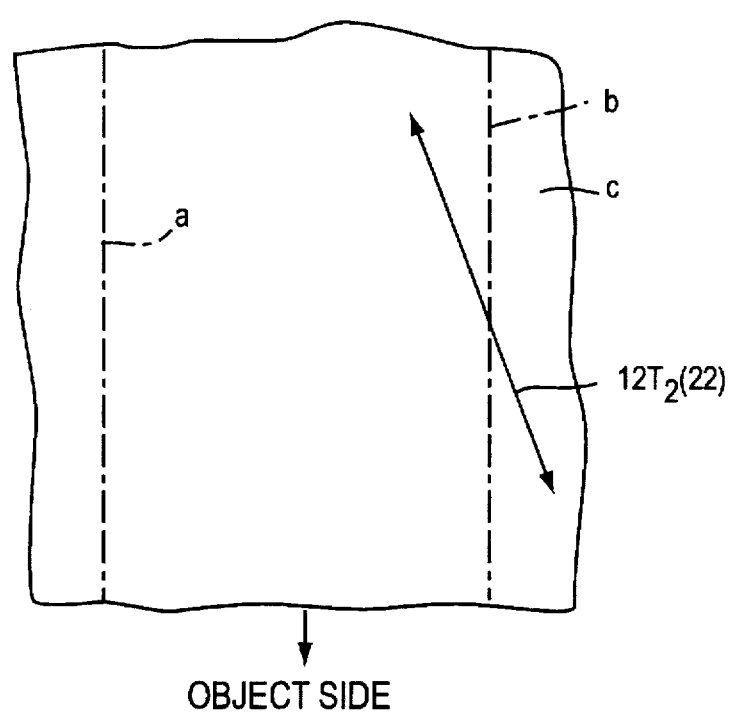

FIGS. 5 and 6 show two examples of a positional relationship between the photographing optical system 11 and the finder optical system 10. The finder optical system 10 is located directly above the photographing optical system 11 in FIG. 5. On the other hand, in FIG. 6, the finder optical system 10 is located above the photographing optical system 11 in the upper right direction thereof. In both the arrangements shown in FIGS. 5 and 6, the axis of the guide rod 22 of the first lens group 12 lies in an imaginary plane "c" which includes the optical axis "a" of the photographing optical system and the optical axis "b" of the finder optical system and which is perpendicular to the sheet of the drawing (FIGS. 5 and 6). FIGS. 11A and 11B show two examples of the direction of the axis of the guide rod 22 within the plane "c".

On the assumption that the distance between the optical axes "a" and "b" is $d_{ab}$ (mm); the object distance is L (mm); a first reference distance at which a reference diopter (normally set at approximately −1 diopter) is set is $S_1$ (mm); a second reference distance at which the optical axis "a" of the photographing optical system intersects the optical axis "b" of the finder optical system is "$S_2$" (mm); the magnification of the viewfinder is $M_f$; and the focal length of the photographing optical system is "f" (mm), the deviation of diopter from the reference diopter (i.e., $\Delta D$ (Dpt)) and the degree of parallax on an image plane of the photographing optical system (i.e., A P (mm)) are represented by the following equations:

$$\Delta D = (L^{-1} - S_1^{-1}) \times M_f^2 \times 1000$$

$$\Delta P = (L^{-1} - S_2^{-1}) \times d_{ab} \times f$$

As can be understood from the foregoing, the parallax error and the deviation of diopter are in proportion to the difference between reciprocal of the object distance "L" and reciprocal of the first reference distance and the difference between reciprocal of the object distance "L" and reciprocal of the second reference distance, respectively. Since parallax error and diopter are defined by functions of distance, the movement of the first lens group 12 in the direction x perpendicular to the optical axis "b" of the finder optical system by the displacement corresponding to the distance so as to intersect the optical axis "a" of the photographing optical system and the optical axis "b" of the finder optical system causes the optical axis to be inclined due to the prism effect of the lens to thereby compensate the parallax error.

Furthermore, the movement of the first lens group 12 in the direction z parallel with the optical axis "b" of the finder optical system by the displacement corresponding to the distance causes the object distance to be changed to thereby change and correct the diopter. The inclination angle of the guide rod 22 is such that the above-mentioned displacements of the first lens group 12 in the directions x and z with respect to the object distance are obtained to compensate parallax error and adjust the diopter.

The first lens group 12 is moved towards the object to be photographed when the object distance is small, and away from the object when the object distance is large, respectively. If the first lens group 12 has a positive power, the first lens group 12 is moved in the diagonal direction with respect to the optical axis "b" of the finder optical system, so that the movement of the first lens group 12 towards the object causes the first lens group 12 to come close to the optical axis "a" of the photographing optical system, and the movement of the first lens group 12 away from the object causes the first lens group 12 to come away from the optical axis "a", respectively, as shown in FIG. 11A. Conversely, if the first lens group 12 has a negative power, the movement of the first lens group 12 towards the object causes the first lens group 12 to come away from the optical axis "a" of the photographing optical system, and the movement of the first lens group 12 away from the object causes the first lens group 12 to come close to the optical axis "a", respectively, as shown in FIG. 11B.

Figure 7:
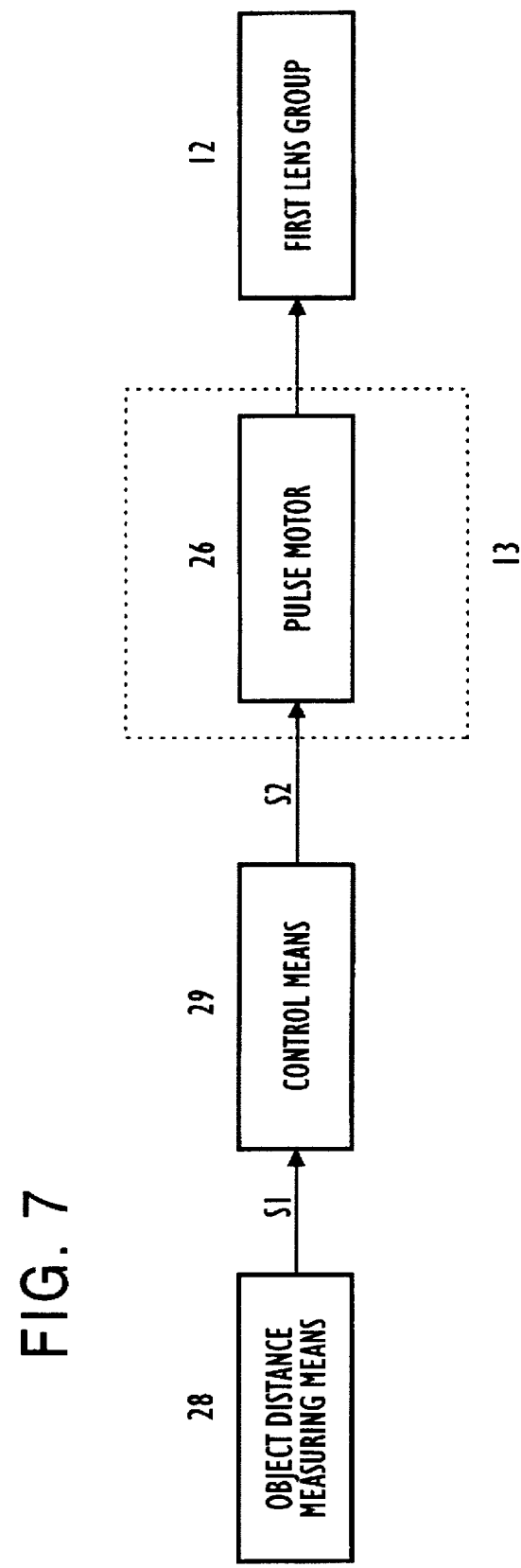
FIG. 7 is a block diagram of a control system of a lens driving means control signal.

To continuously move the first lens group 12 in accordance with the object distance, as mentioned above, the lens driving means 13 operates when the compensation control means 29 outputs the control signal S2 to the pulse motor 26 in response to the object distance signal S1 outputted from the object distance measuring means 28 provided in the camera body B, as can be seen in FIG. 7. The object distance signal S1 is generated in accordance with object distance data of the object distance measuring means 28.

The rotation of the pulse motor 26 in response to the control signal S2 is transmitted to the finder cam 23a through the pinion 25 and the reduction gear 24. Consequently, the cam 23a rotates to move forward the guide piece 21a which is pressed against the cam 23a', so that the slider 21 is moved forward in the diagonal direction along the guide shaft 22 against the biasing spring 27.

Figure 8:
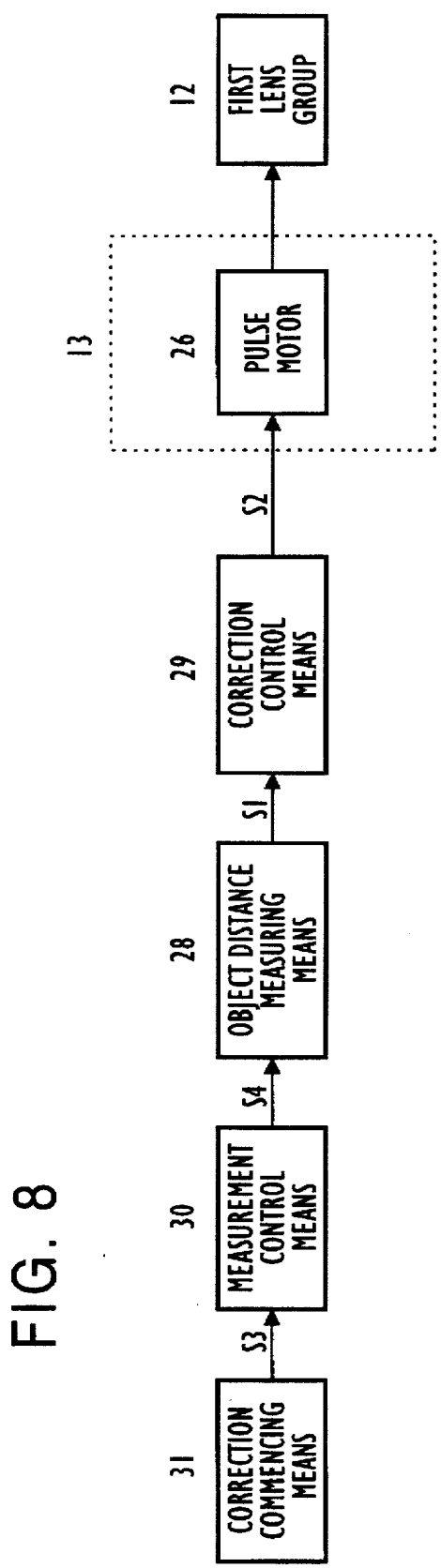
FIG. 8 is a block diagram of a control system of a finder according to the present invention.

FIG. 8 shows a block diagram of a control system in which the parallax error compensation and the diopter adjustment can be effected even before the shutter button is actuated (i.e., photometering switch is turned ON). In comparison with the block diagram shown in FIG. 7, there are additionally provided a repetitive command means (i.e., means for repeatedly measuring the object distance or measurement control means) 30 and a correction (i.e., compensation) commencing means 31.

The measurement control means (i.e., repetitive measuring means) 30 operates in response to the correction start signal S3 which is outputted when the main switch (i.e., correction commencing means) 31 is turned ON to output the operation signal S4 to the measuring means 28.

The measuring means 28 repeatedly measures the object distance at predetermined intervals in accordance with the operation signal S4.

The main switch 31, which functions as the correction commencing means, is made of a switch other than a release switch (i.e., photometering switch) which is turned ON when the photographer determines the composition through the viewfinder. Alternatively, the correction commencing means can be constituted by a grip sensor (not shown) or a similar device provided on an assistant grip which is gripped by a finger or fingers of a photographer who holds the camera body B. The grip sensor is turned ON when the photographer grips the assistant grip of the camera body.

Figure 9:
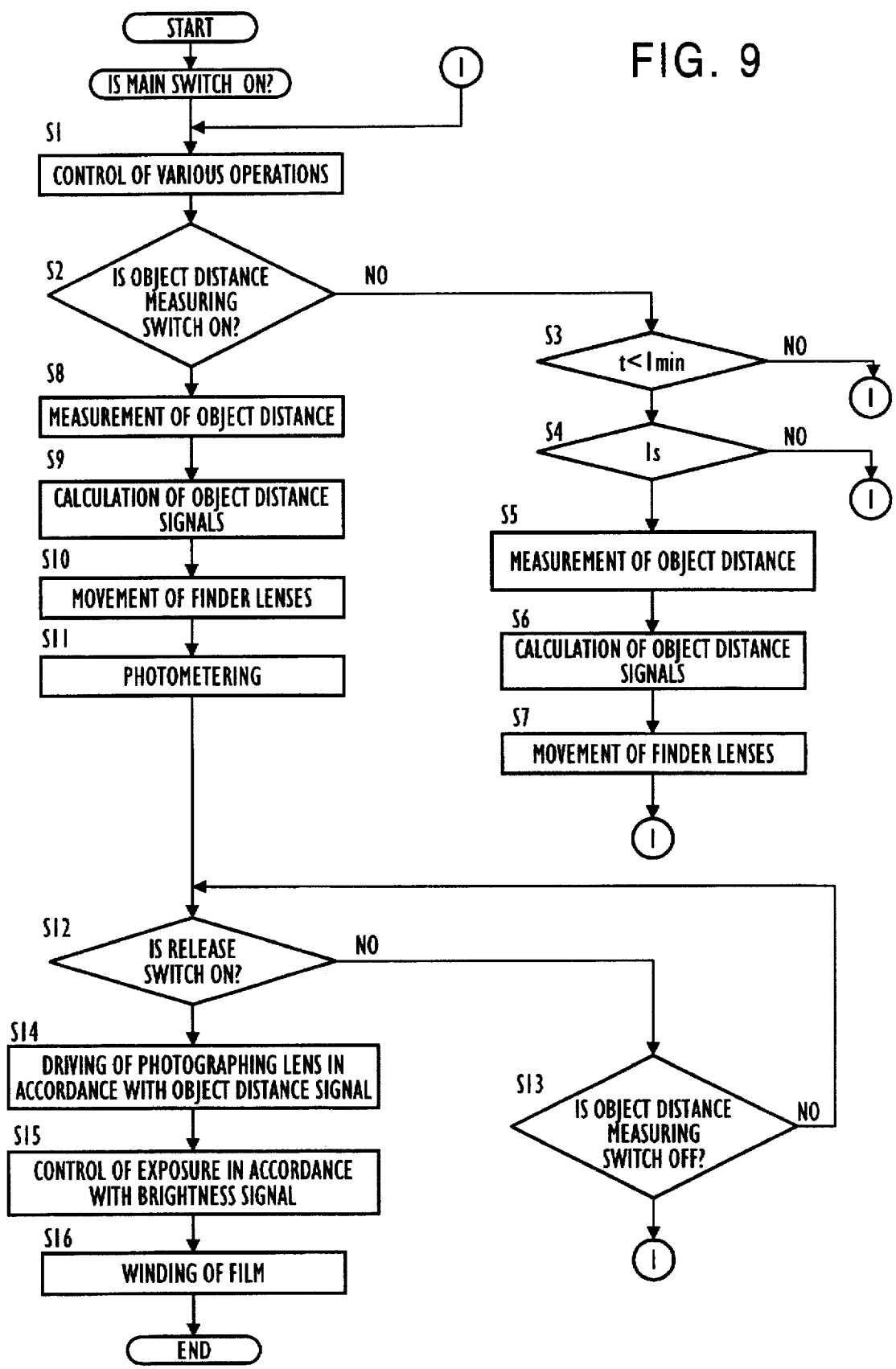
FIG. 9 is a flow chart of a control system shown in FIG. 8.

The operation of the measurement control means 30 will be discussed below, with reference to FIG. 9.

When the main switch 31 is turned ON, to prepare the camera for photographing, various control operations are carried out and ON/OFF states of the various switches are checked at step S1. Thereafter, at step S2, whether or not the object distance measuring switch is turned ON is checked. If the object distance measuring switch is OFF, control proceeds to step S3. The object distance measuring switch is turned ON when the shutter button is depressed by a half step.

At step S3, the lapse of time since the operation of the main switch 31 is detected, and if the lapse time t is above 1 minute, control is returned to step S1. Conversely, if the lapse time t is below 1 minute, control proceeds to step S4.

Whether or not the lapse time t is shorter than 1 second is checked at step S4. If the lapse time t is shorter than 1 second, control is returned to step S1. Conversely, if the lapse time is not shorter than 1 second, control proceeds to step S5.

The object distance is measured at step S5. Thereafter, the arithmetic operation of the object distance signal is carried out at step S6. Then, at step S7, the movement of the finder lens is effected by the lens driving means 13 in accordance with the calculation result obtained at step S6. After the movement of the finder lens is completed, control is returned to step S1. Namely, the measurement of the object distance is repeatedly effected every second until 1 minute elapses from the operation of the main switch 31, even if the object distance measuring switch is OFF (i.e., the shutter button is not depressed by a half step), so that the correcting lens group 12 can be moved in accordance with the measurement.

If the object distance measuring switch is turned ON at step S2, control proceeds to step S8 at which the measurement of the object distance is carried out. Thereafter, the calculation of the object distance signal is effected at step S9. In accordance with the calculation result at step S9, the finder lens is driven by the lens driving means 13 at step S10. Thereafter, the photometering operation (i.e., measurement of the brightness of the object) is performed at step S11.

At step S12, whether or not the release switch is turned ON is checked. If the release switch is OFF, control proceeds to step S13. The release switch is turned ON when the shutter button is depressed by a full step.

At step S13, whether or not the photometering switch is turned OFF is checked. If the photometering switch is OFF, the timer is cleared and control is returned to step S1. Conversely, if the photometering switch is ON, control is returned to step S12.

Consequently, if the photometering switch which has been turned ON is turned OFF without turning the release switch ON, i.e., if the shutter release switch which has been depressed by half step is turned OFF, the measurements of the object distance are repeatedly effected every second for 1 minute. For the 1 minute, the first lens group 12 is driven in accordance with the measurements.

If the release switch is turned ON at step S12, control proceeds to step S14. At step S14, the photographing lens is driven in accordance with the object distance signal. Thereafter, exposure control is executed in accordance with the brightness signal at step S15, and then, control proceeds to step S16 to wind the film.

As can be understood from the above discussion, the object distance measuring means which provides object distance data repeatedly measures the object distance at predetermined intervals after the various setting operations necessary to take a photograph and the various operations necessary for the measurement are completed. Consequently, when the photographer determines a composition of an object to be photographed without turning the object distance measuring switch ON, parallax error is continuously compensated by the parallax error compensating apparatus, in accordance with the object distance.

Two examples (i.e., embodiments) of numerical data of the optical elements in the finder optical system will be discussed below. In these examples, the finder is a zoom finder having a variable power (i.e., variable magnification), wherein the first lens group 12 is moved in the diagonal direction with respect to the optical axis to compensate the parallax error and adjust the diopter, and the first, second and third lens groups are moved in the optical axis direction to effect the zooming operation. The photographing optical system is provided below the lens arrangement show in the drawings (FIGS. 12, 13, 20, and 21).

Figure 12:
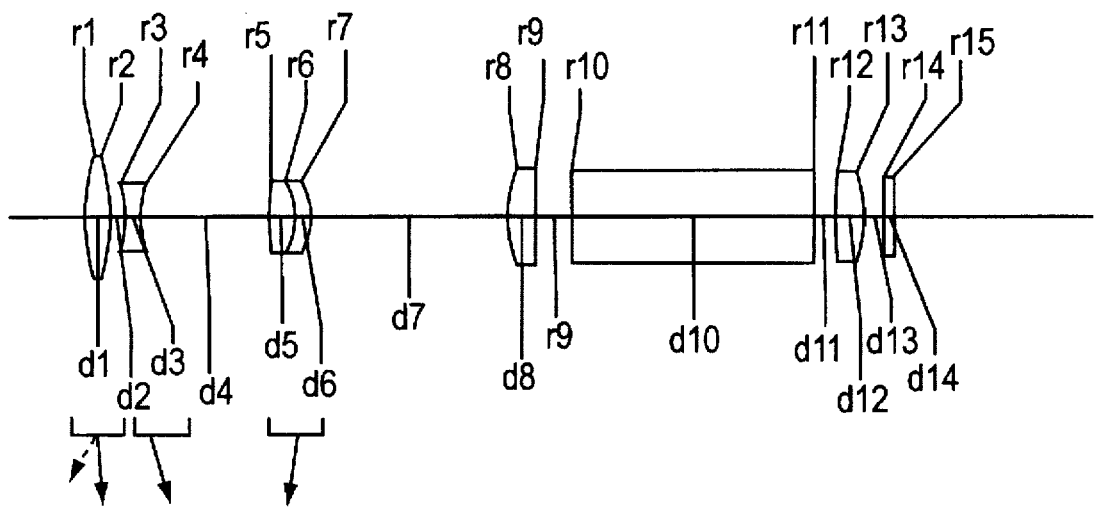
FIG. 12 is a schematic view of a lens arrangement of a finder optical system at a wide angle state in a reference position in which correction is not effected, according to a first embodiment of the present invention.
Figure 13:
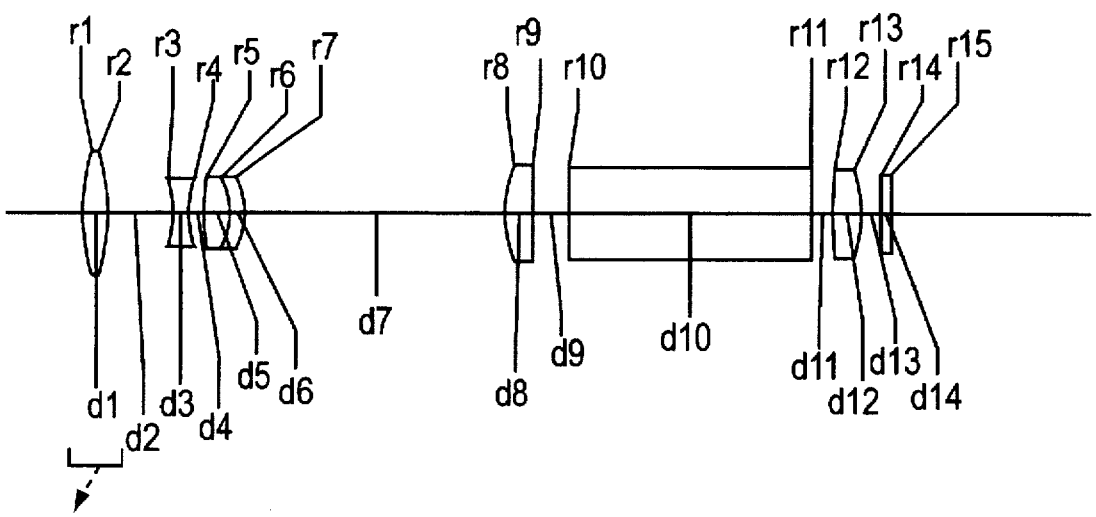
FIG. 13 is a schematic view of a lens arrangement of a finder optical system at a telephoto state in a reference position in which correction is not effected, according to a first embodiment of the present invention.
Figure 14A:
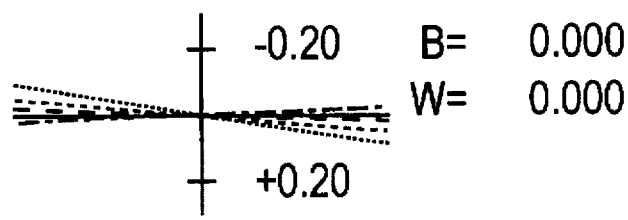
FIG. 14 is a diagram of transverse aberrations of a finder optical system in a wide angle position at an infinite object distance, according to a first embodiment of the present invention.
Figure 14B:
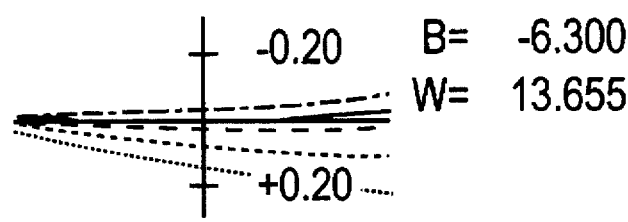
Figure 14C:
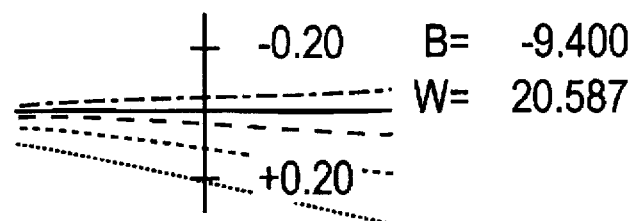
Figure 14D:
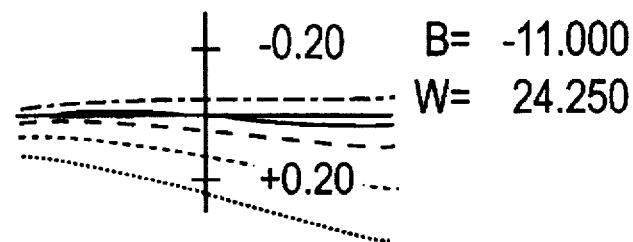
Figure 15A:
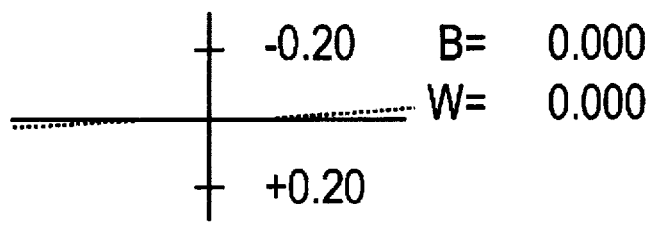
FIG. 15 is a diagram of transverse aberrations of a finder optical system in a telephoto position at an infinite object distance, according to a first embodiment of the present invention.
Figure 15B:
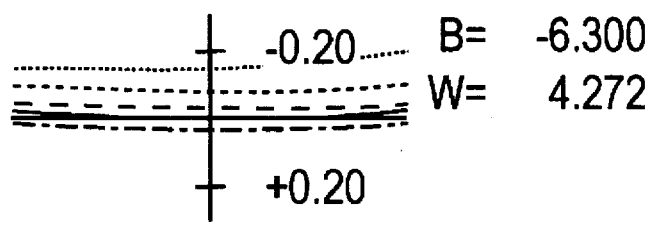
Figure 15C:
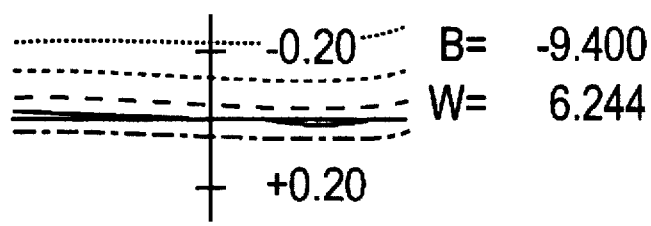
Figure 15D:
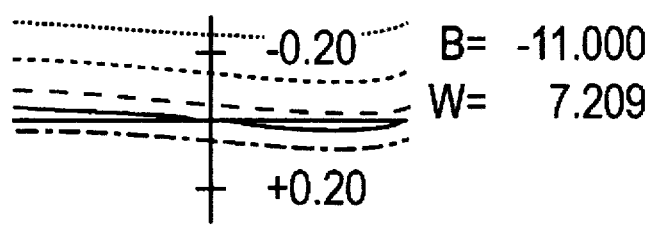
Figure 16A:
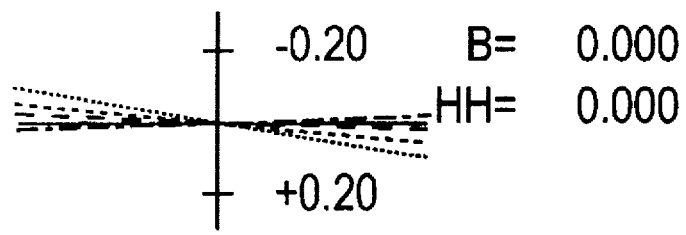
FIG. 16 is a diagram of transverse aberrations of a finder optical system in a wide angle position when the object distance is 1 meter without moving a first lens group to compensate diopter/parallax.
Figure 16B:
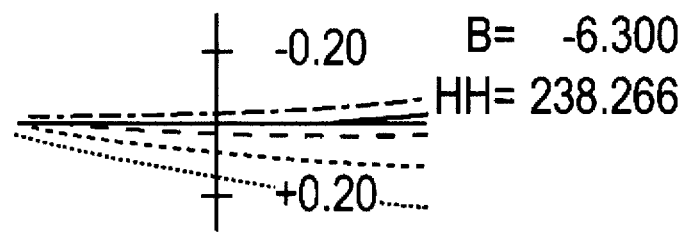
Figure 16C:
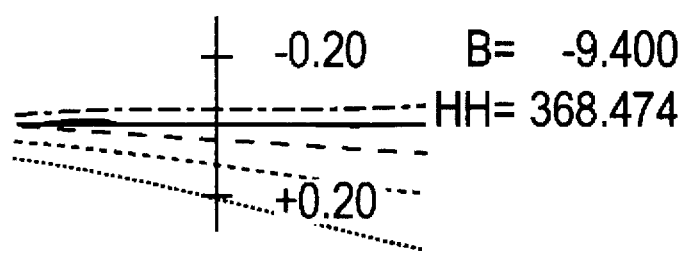
Figure 16D:
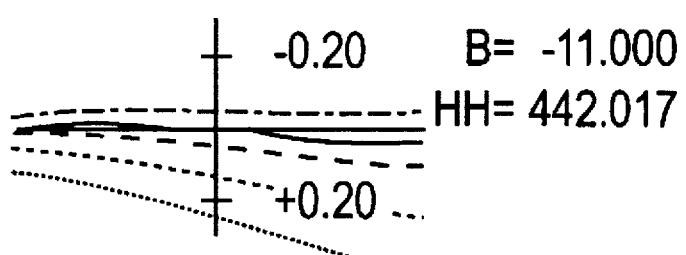
Figure 17A:
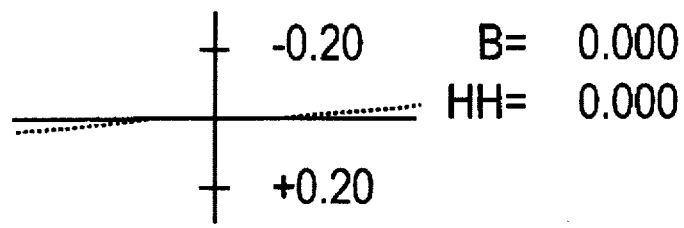
FIG. 17 is a diagram of transverse aberrations of a finder optical system in a telephoto position when the object distance is 1 meter without moving a first lens group to compensate parallax error or adjust the diopter.
Figure 17B:
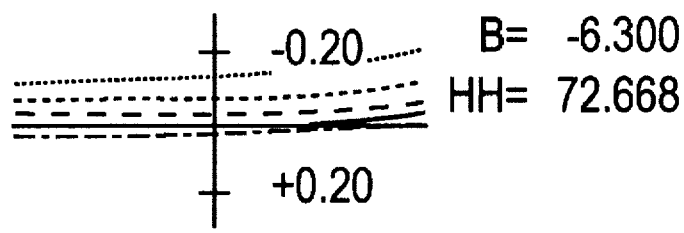
Figure 17C:
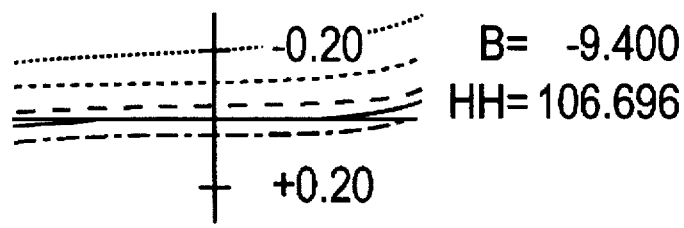
Figure 17D:
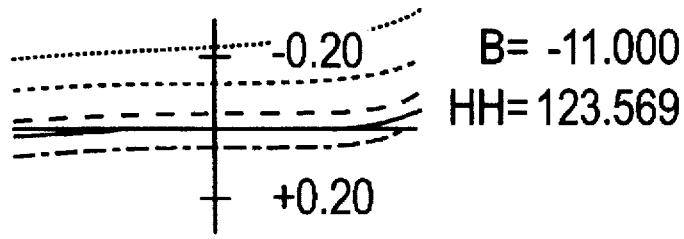
Figure 18A:
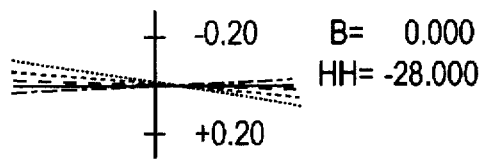
FIG. 18 is a diagram of transverse aberrations of a finder optical system in a wide angle position at a 1 meter object distance when a first lens group is moved to compensate parallax error or adjust the diopter.
Figure 18B:
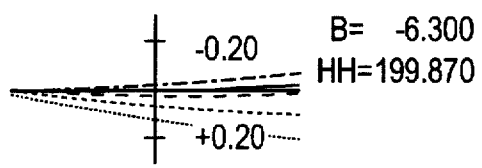
Figure 18C:
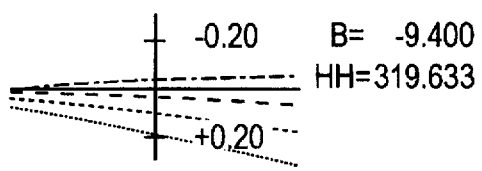
Figure 18D:
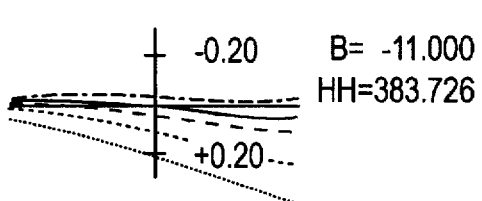
Figure 18E:
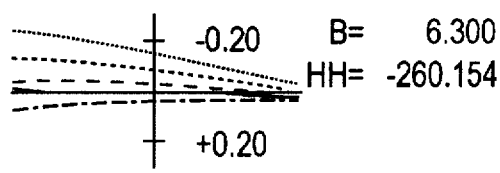
Figure 18F:
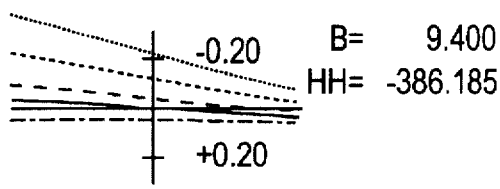
Figure 18G:
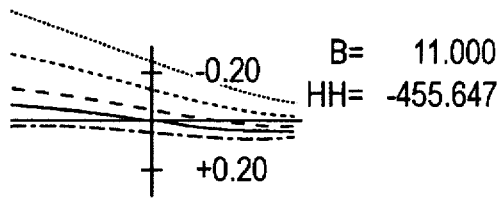
Figure 19A:
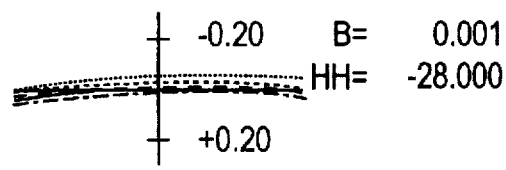
FIG. 19 is a diagram of transverse aberrations of a finder optical system in a telephoto position at a 1 meter object distance when a first lens group is moved to compensate parallax error or adjust the diopter.
Figure 19B:
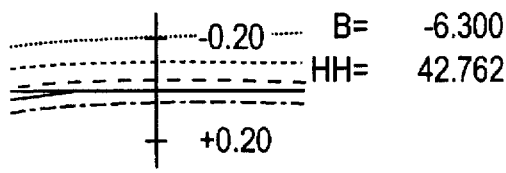
Figure 19C:
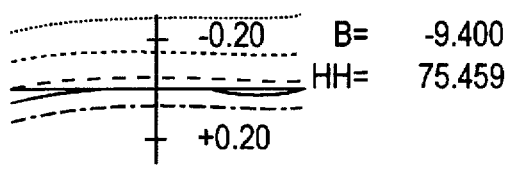
Figure 19D:
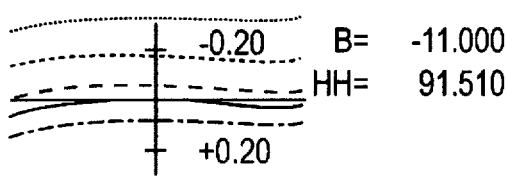
Figure 19E:
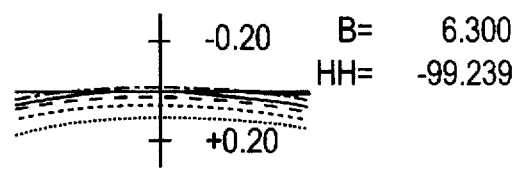
Figure 19F:
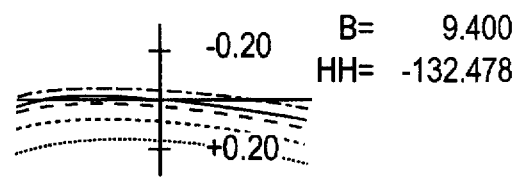
Figure 19G:
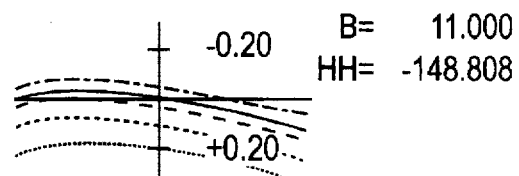

In FIGS. 12 and 13 which show a first embodiment of lens arrangements at wide angle position and a telephoto position in a reference state before the compensation, in which an object located at a reference distance is viewed, the direction of the movement of the lens groups from the wide angle position to the telephoto position is designated by arrows of a solid line (FIG. 12), and the direction of the movement of the first lens group 12 to adjust the diopter/parallax from the infinite object distance towards the close object distance is designated by dotted line arrows (FIGS. 12 and 13), respectively.

Numerical data are shown in Tables 1 and 2 below. In Tables 1 and 2, "r" designates the radius of curvature; "d" the lens thickness or spatial distance of the lenses; "n" the refractive index at the d-line (588 nm); "υ" the Abbe number; "M" the magnification; and "ω (degree)" the real field of view, respectively. In the example, the eye relief is 12.45 mm from the terminal lens surface and the eye ring (i.e., diameter of the exit pupil at the eye point) is ⌀ 3 mm.

The 1st, 2nd, 3rd, 5th, 7th and 12th lens surfaces are aspherical surfaces which are represented by the following formula.

$$X = CY^2/\{1+[1-(1+30 K)C^2Y^2]^{1/2}\} + A4 Y^{30} A6 Y^6 + A8 Y^8 + \ldots$$

wherein X designates the distance of the coordinate point on the aspherical surface at which the height from the optical axis is Y from the tangential surface at the apex of the aspherical surface; C the curvature (1/r) at the apex of the aspherical surface; K the factor of cone; and, A4, A6 and A8 the factors of the 4th-, 6th- and 8th-order aspherical surfaces, respectively.

The values of K and A4, A6 and A8 are shown in Table 3 below.

TABLE 1

| surface No. | r | d | n | υ |
|---|---|---|---|---|
| 1 | 18.918 | 2.62 | 1.49176 | 57.4 |
| 2 | −22.886 | variable | | |
| 3 | −8.132 | 1.50 | 1.58547 | 29.9 |
| 4 | 11.136 | variable | | |
| 5 | 17.699 | 2.62 | 1.49176 | 57.4 |
| 6 | −7.768 | 1.50 | 1.58547 | 29.9 |
| 7 | −8.891 | variable | | |
| 8 | 13.931 | 3.00 | 1.49176 | 57.4 |
| 9 | ∞ | 3.80 | | |
| 10 | ∞ | 25.50 | 1.49176 | 57.4 |
| 11 | ∞ | 2.20 | | |
| 12 | 39.666 | 3.00 | 1.49176 | 57.4 |
| 13 | −17.513 | 2.00 | | |
| 14 | ∞ | 1.00 | 1.49176 | 57.4 |
| 15 | ∞ | | | |

TABLE 2

| M | 0.46 | 1.45 |
|---|---|---|
| ω | 24.3° | 7.2° |
| d2 | 1.73 | 6.73 |
| d4 | 13.04 | 1.50 |
| d7 | 19.94 | 26.47 |

TABLE 3

| 1st surface | 2nd surface | 3rd surface |
|---|---|---|
| K = 0.00 | K = 0.00 | K = 0.00 |
| A4 = −0.12135 × 10$^{-4}$ | A4 = 0.71374 × 10$^{-3}$ | A4 = 0.82090 × 10$^{-4}$ |
| A6 = 0.00 | A6 = −0.70886 × 10$^{-6}$ | A6 = −0.42802 × 10$^{-5}$ |
| A8 = −0.14163 × 10$^{-7}$ | A8 = 0.00 | A8 = 0.00 |
| 5th surface | 7th surface | 12th surface |
| K = 0.00 | K = 0.00 | K = 0.00 |
| A4 = −0.34547 × 10$^{-3}$ | A4 = 0.72403 × 10$^{-4}$ | A4 = −0.28804 × 10$^{-4}$ |
| A6 = −0.81920 × 10$^{-5}$ | A6 = −0.63178 × 10$^{-5}$ | A6 = −0.12339 × 10$^{-5}$ |
| A8 = 0.00 | A8 = 0.00 | A8 = 0.14894 × 10$^{-7}$ |

In the first embodiment in which the first lens group 12 is a positive power lens, when the object distance is small, the first lens group 12 is moved towards the object and the optical axis "a" of the photographing optical system 11. When the object distance is large, the first lens group 12 is moved away from the object and the optical axis "a" of the photographing optical system, as can be seen in FIG. 11A.

In more detail, when the object distance is infinite, the optical axis of the first lens group 12 is identical to the optical axis "b" of the finder optical system. When the object distance is 1 meter, the first lens group 12 is moved towards the object by 0.49 mm and towards the optical axis "a" of the photographing optical system by 0.62 mm, with reference to the infinite object distance. Thus, the change of the diopter and the parallax can be restricted.

FIGS. 14 and 15 show the transverse aberrations of the finder optical system at the infinite object distance in the wide angle position and the telephoto position, respectively. In the illustrated embodiment in which the infinite object distance is the reference distance, the diopter is −1.00 Dpt.

In FIGS. 14 and 15, the ordinate represents the emission angle (degree) of light emitted from the terminal lens surface of the finder, and the abscissa represents the coordinates of the entrance pupil, respectively. "B" designates the apparent field of view (degree), and "W" the real field of view (degree), respectively.

FIGS. 16 and 17 show the transverse aberrations of the finder optical system at the object distance of 1 meter in the wide angle position and the telephoto position, respectively, when no movement of the first lens group 12 to compensate the diopter/parallax occurs, for comparison sake. The diopter is −1.22 Dpt at the wide angle position and −3.16 Dpt at the telephoto position, respectively.

FIGS. 18 and 19 show the transverse aberrations of the finder optical system at the object distance of 1 meter in the wide angle position and the telephoto position, respectively, when the first lens group 12 is moved to compensate the parallax error and adjust the diopter. The diopter after compensation is −1.00 Dpt in FIGS. 18 and 19. In FIGS. 18 and 19, "HH" designates the height of the object. When the first lens group 12 is moved in the oblique direction with respect to the optical axis, the aberration becomes asymmetric in the vertical direction (i.e., height direction) of the image surface. Accordingly, the transverse aberrations for both the positive object height and the negative object height with respect to the optical axis are shown in FIGS. 18 and 19. Figures on the left half correspond to positive object height, and figures on the right half correspond to negative object height, respectively.

Figure 20:
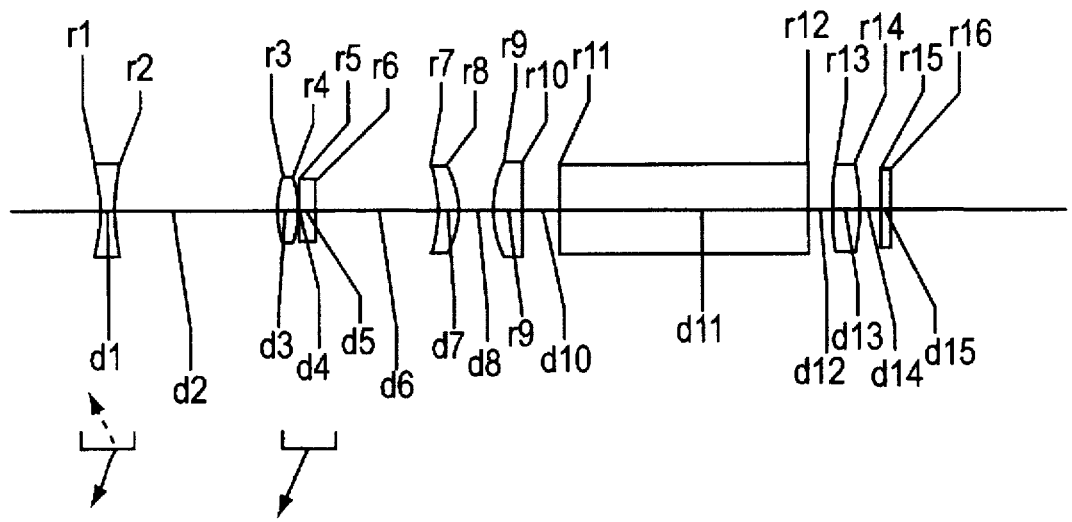
FIG. 20 is a schematic view of a lens arrangement of a finder optical system at a wide angle state in a reference position, according to a second embodiment of the present invention.
Figure 21:
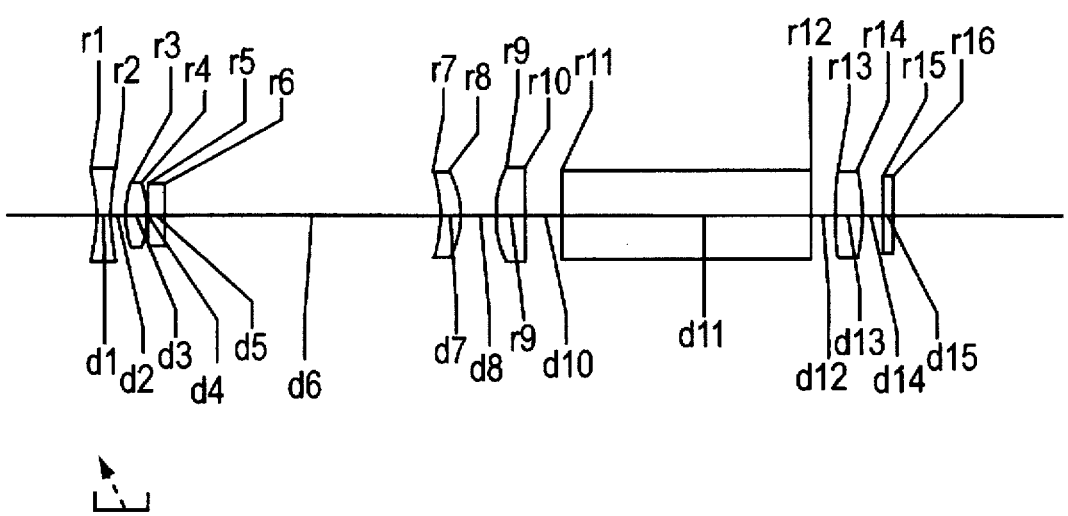
FIG. 21 is a schematic view of a lens arrangement of a finder optical system at a telephoto state in a reference position, according to a second embodiment of the present invention.
Figure 22A:
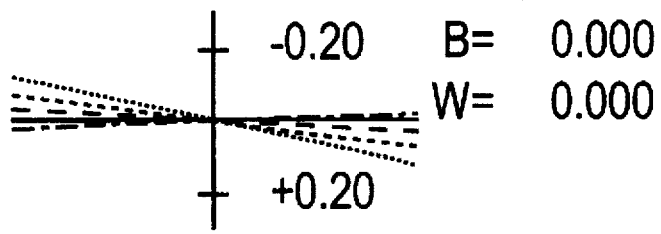
FIG. 22 is a diagram of transverse aberrations of a finder optical system in a wide angle position at an infinite object distance, according to a second embodiment of the present invention.
Figure 22B:
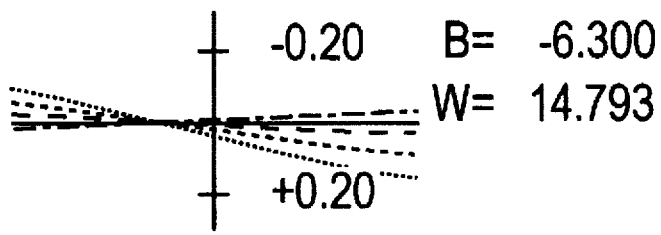
Figure 22C:
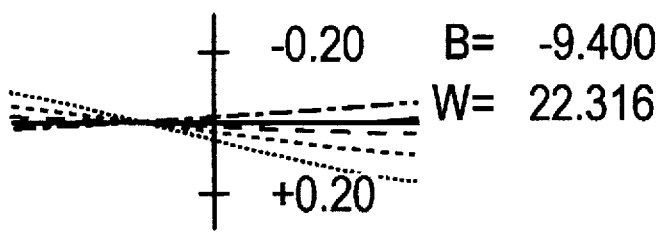
Figure 22D:
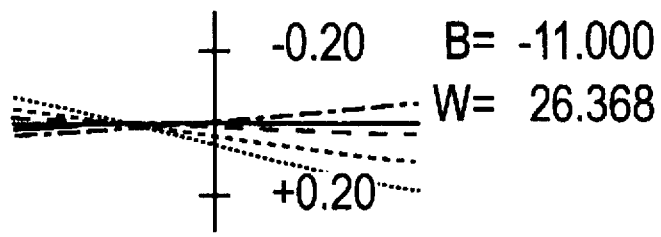
Figure 23A:
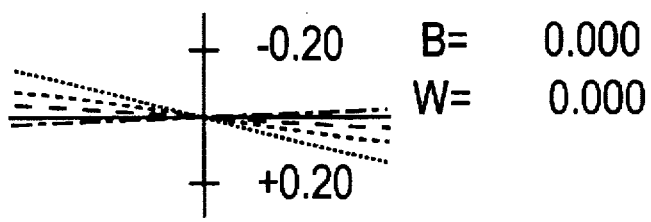
FIG. 23 is a diagram of transverse aberrations of a finder optical system in a telephoto position at an infinite object distance, according to a second embodiment of the present invention.
Figure 23B:
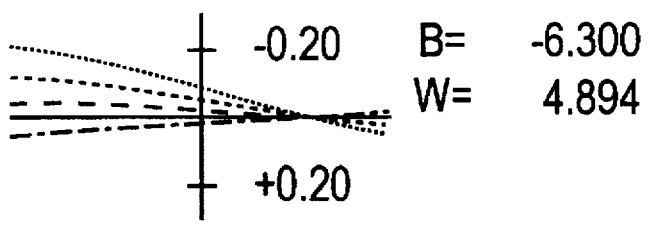
Figure 23C:
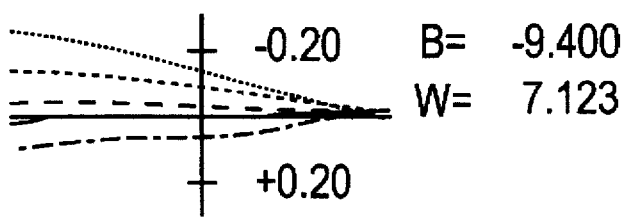
Figure 23D:
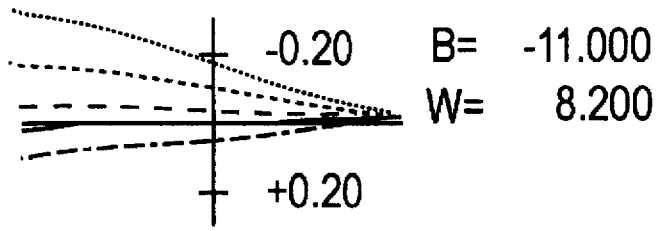
Figure 24A:
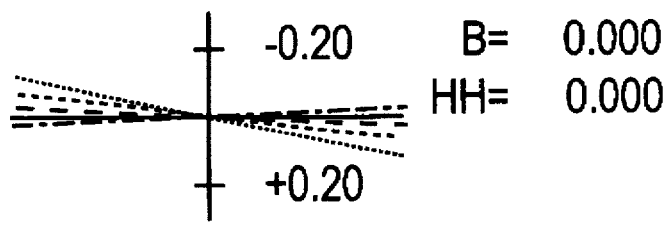
FIG. 24 is a diagram of transverse aberrations of a finder optical system in a wide angle position when the object distance is 1 meter without moving a first lens group to compensate parallax error or make a diopter adjustment, according to a second embodiment of the present invention.
Figure 24B:
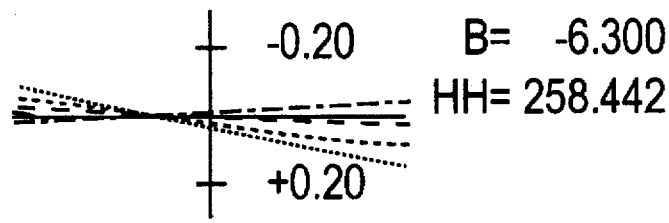
Figure 24C:
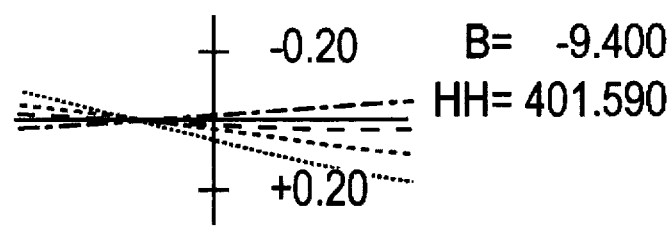
Figure 24D:
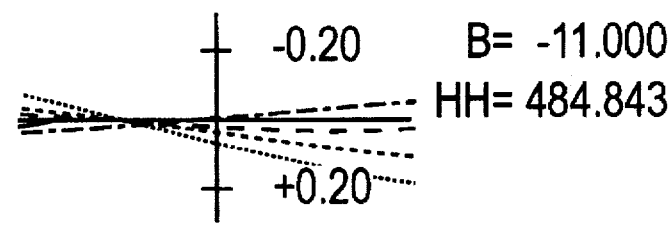
Figure 25A:
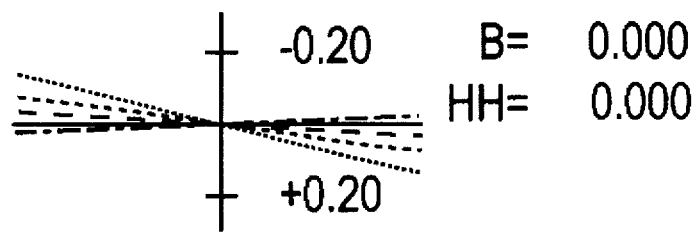
FIG. 25 is a diagram of transverse aberrations of a finder optical system in a telephoto position when the object distance is 1 meter without moving a first lens group to compensate parallax error or make a diopter adjustment, according to a second embodiment of the present invention.
Figure 25B:
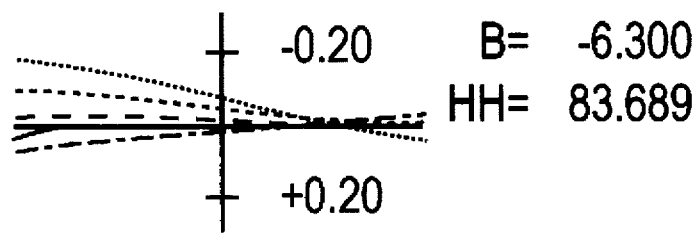
Figure 25C:
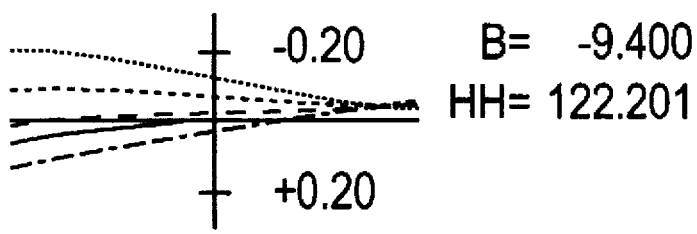
Figure 25D:
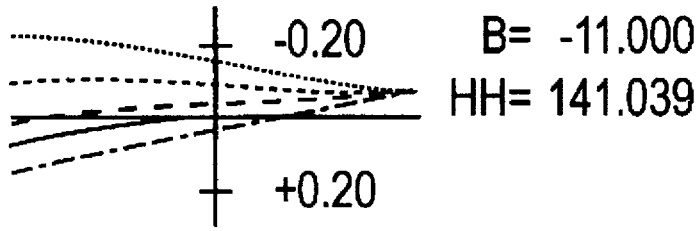
Figure 26A:
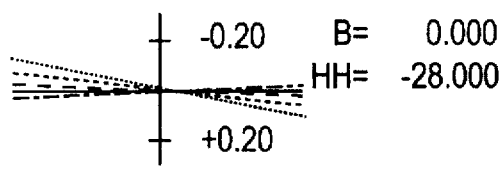
FIG. 26 is a diagram of transverse aberrations of a finder optical system in a wide angle position at 1 meter of object distance when a first lens group is moved to compensate parallax error or make a diopter adjustment, according to a second embodiment of the present invention; and, FIG. 27 is a diagram of transverse aberrations of a finder optical system in a telephoto position at 1 meter of object distance when a first lens group is moved to compensate parallax error or make a diopter adjustment, according to a second embodiment of the present invention.
Figure 26B:
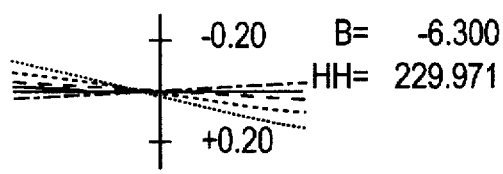
Figure 26C:
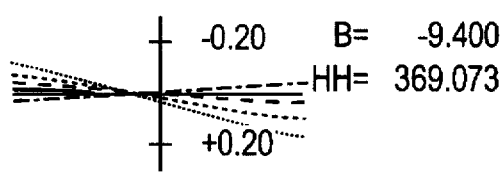
Figure 26D:
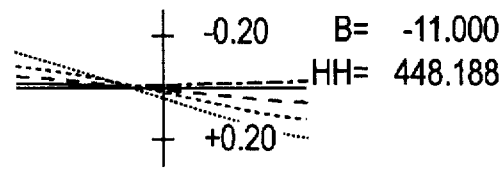
Figure 26E:
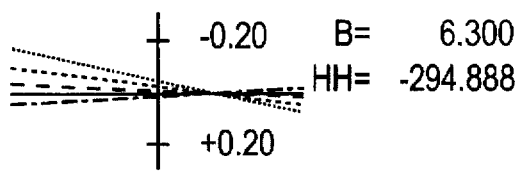
Figure 26F:
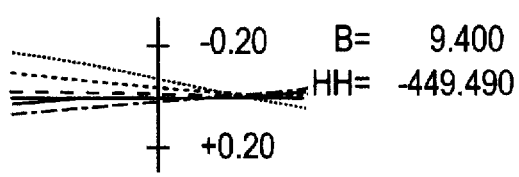
Figure 26G:
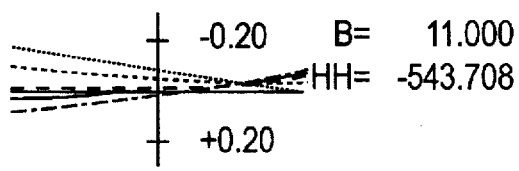
Figure 27A:
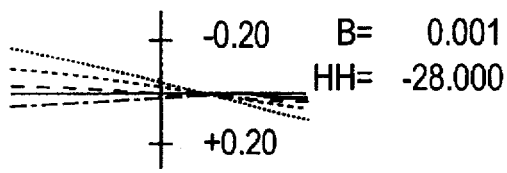
Figure 27B:
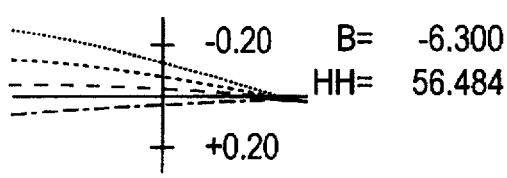
Figure 27C:
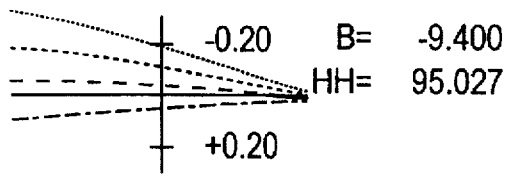
Figure 27D:
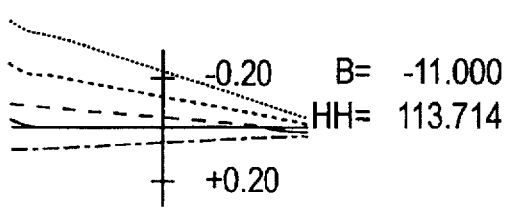
Figure 27E:
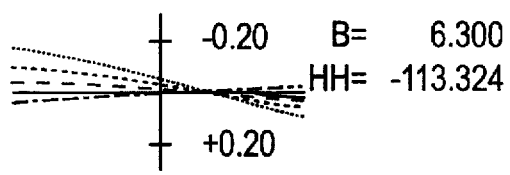
Figure 27F:
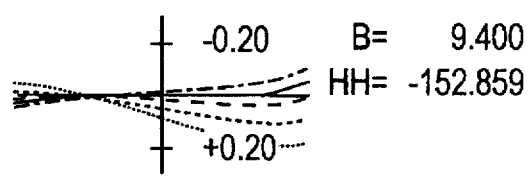
Figure 27G:
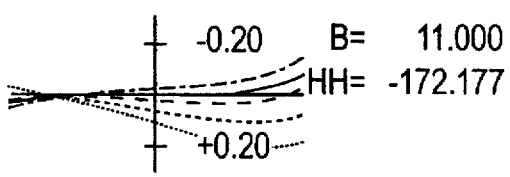

FIGS. 20 and 21 show a second embodiment of lens arrangements at wide angle position and a telephoto position in a reference state before the compensation, respectively. Numerical data in the second embodiment are shown in Tables 4 and 5 below. In the second embodiment, the eye relief is 12.0 mm from the terminal lens surface and the eye ring is ø 3 mm. The 1st, 6th, 7th and 13th lens surfaces are aspheric surfaces. The factors of the aspheric surfaces are shown in Table 6.

TABLE 4

| surface No. | r | d | n | ν |
|---|---|---|---|---|
| 1 | −14.962 | 1.50 | 1.49176 | 57.4 |
| 2 | 25.794 | variable | | |
| 3 | 9.189 | 2.21 | 1.49176 | 57.4 |
| 4 | −15.899 | 0.10 | | |
| 5 | −236.166 | 1.50 | 1.58547 | 29.9 |
| 6 | 76.359 | variable | | |
| 7 | −11.206 | 2.00 | 1.49176 | 57.4 |
| 8 | −10.250 | 3.50 | | |
| 9 | 12.828 | 3.00 | 1.49176 | 57.4 |
| 10 | ∞ | 4.00 | | |
| 11 | ∞ | 25.50 | 1.49716 | 57.4 |
| 12 | ∞ | 2.20 | | |
| 13 | 24.640 | 3.00 | 1.49176 | 57.4 |
| 14 | −23.481 | 2.00 | | |
| 15 | ∞ | 1.00 | 1.49176 | 57.4 |
| 16 | ∞ | | | |

TABLE 5

| M | 0.43 | 1.26 |
|---|---|---|
| ω | 26.4° | 8.2° |
| d2 | 16.69 | 1.50 |
| d6 | 12.98 | 28.67 |

TABLE 6

| 1st surface | 6th surface |
|---|---|
| K = 0.00 | K = 0.00 |
| A4 = 0.93451 × $10^{-4}$ | A4 = 0.36936 × $10^{-3}$ |

TABLE 6-continued

| A6 = −0.98545 × $10^{-6}$ | A6 = 0.55412 × $10^{-5}$ |
| A8 = 0.00 | A8 = 0.00 |
| 7th surface | 13th surface |
| K = 0.00 | K = 0.00 |
| A4 = −0.23437 × $10^{-3}$ | A4 = −0.39681 × $10^{-4}$ |
| A6 = −0.22299 × $10^{-5}$ | A6 = −0.40186 × $10^{-6}$ |
| A8 = 0.35539 × $10^{-7}$ | A8 = 0.40393 × $10^{-8}$ |

In the second embodiment in which the first lens group is a negative power lens, when the object distance is small, the first lens group 12 is moved towards the object and away from the optical axis "a" of the photographing optical system 11. When the object distance is large, the first lens group 12 is moved away from the object and towards the optical axis "a", as can be seen in FIG. 11B.

In more detail, when the object distance is 1 meter, the first lens group 12 is moved towards the object by 0.36 mm and away from the optical axis "a" of the photographing optical system by 0.548 mm, with reference to the infinite object distance. Thus, the change of the diopter and the parallax error can be restricted.

FIGS. 22 and 23 show the transverse aberrations of the finder optical system at the infinite object distance in the wide angle position and the telephoto position, respectively. In the illustrated embodiment in which the infinite object distance is the reference distance, the diopter is −1.00 Dpt.

FIGS. 24 and 25 show a comparative example of the transverse aberrations of the finder optical system at the object distance being 1 meter in the wide angle position and the telephoto position, respectively, when no movement of the first lens group 12 to adjust the diopter/parallax takes place. The diopter is −1.19 Dpt at the wide angle position and −2.63 Dpt at the telephoto position, respectively.

FIGS. 26 and 27 show the transverse aberrations of the finder optical system at the object distance being 1 meter in the wide angle position and the telephoto position, respectively, when the first lens group 12 is moved to compensate the diopter/parallax. The diopter after compensation is −1.00 Dpt at the wide angle position and −1.03 Dpt at the telephoto position, respectively.

In the above-mentioned embodiments, the compensating lens group 12 is continuously moved in accordance with the object distance to simultaneously and continuously compensate the parallax error and the diopter deviation. However, the basic concept of the present invention can be applied to the compensation, or adjusting, of only one of the parallax and diopter deviation in accordance with the object distance.

Figure 10:
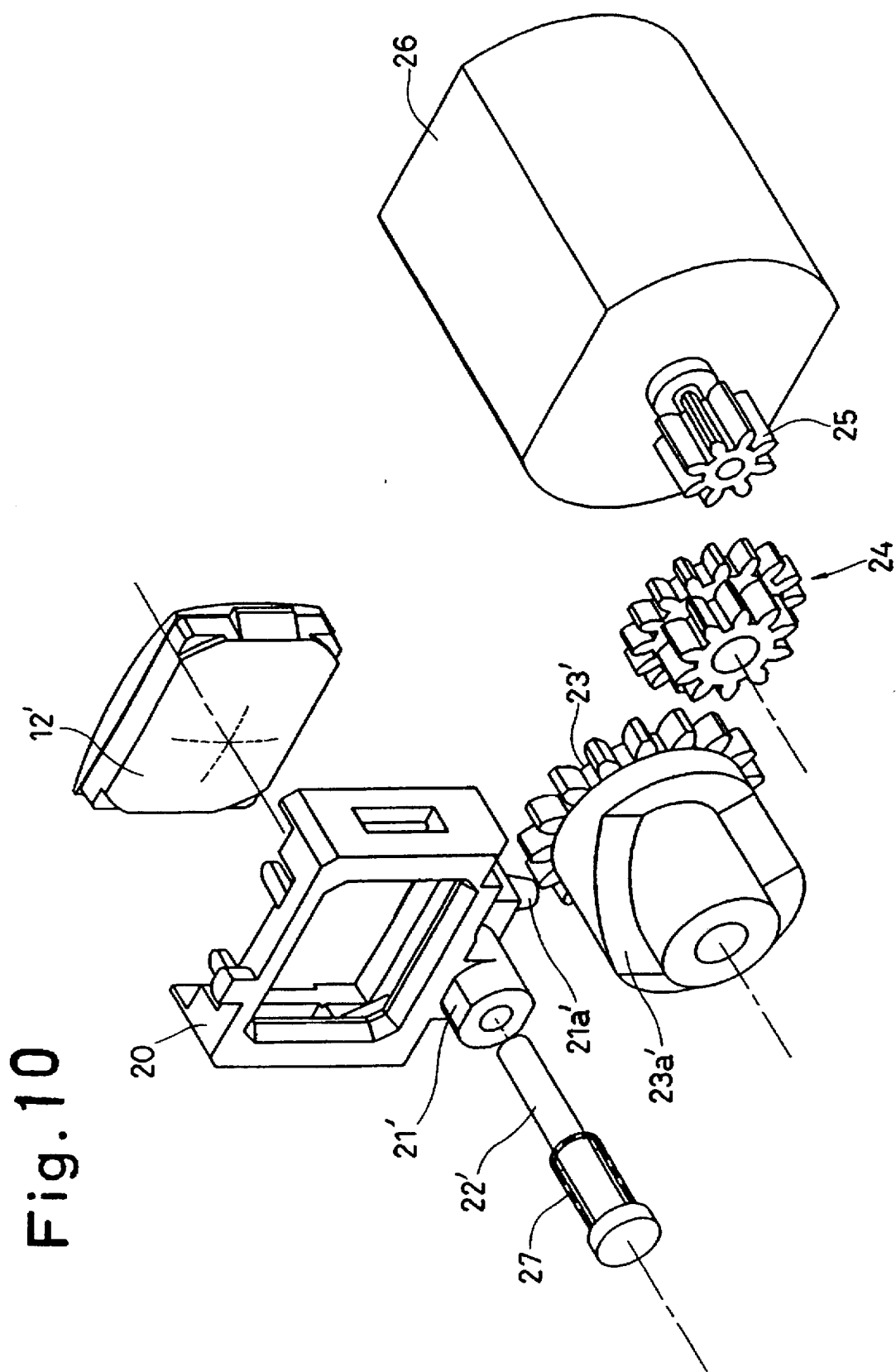
FIG. 10 is an exploded perspective view of a diopter adjusting apparatus according to the present invention.

Namely, as shown in FIG. 10 in which only the diopter adjustment is made, the lens group 12' secured to the lens frame 20 is a diopter correcting lens. The guide shaft 22' which guides the lens frame 20 extends in parallel with the optical axis "b". The guide shaft 22' is inserted in the slider 21' integral with the lens frame 20 and perpendicularly projecting therefrom. The gear 23' which is rotated by the pulse motor 26 through the gears 25 and 24 is provided with the cam surface 23a' which is engaged by the guide piece 21a' integral with the lens frame 20. The guide piece 21a' is always brought into contact with the cam surface 23a' by the spring 27. Consequently, when the motor 26 is rotated in accordance with the object distance, the correcting lens group 12' is moved in the optical axis direction in accordance with the cam profile of the cam surface 23a' to continuously correct the diopter deviation in accordance with the object distance.

To apply the present invention to the compensation of the parallax error only, in accordance with the object distance, the arrangement shown in FIGS. 3 and 4 can be similarly employed.

We claim:

1. A camera viewfinder having a plurality of lens groups, wherein a photographing optical system of the camera is separate from the viewfinder, comprising:
   a parallax error compensating and diopter adjusting lens group being one of said plurality of lens groups;
   a guide for guiding said parallax error compensating and diopter adjusting lens group along a path which intersects an optical axis of the viewfinder so as to move said parallax error compensating and diopter adjusting lens group towards and away from an optical axis of the photographing optical system;
   an object distance detector for detecting a distance of an object to be photographed; and
   a movement control system for moving said parallax error compensating and diopter adjusting lens group, along said guide, to a plurality of different positions along said path, each of said positions being determined in response to a respective object distance detected by said object distance detector, said movement control system moving said parallax error compensating and diopter adjusting lens group towards the object and away from said optical axis of the photographing optical system when said object distance is shorter than a distance to a reference position, said movement control system moving said parallax error compensating and diopter adjusting lens group away from the object and towards said optical axis of the photographing optical system when said object distance is longer than a distance to said reference position.

2. The camera viewfinder of claim 1, said parallax error compensating and diopter adjusting lens group having a least influence on magnification and aberration of the plurality of lens groups comprising the viewfinder optical system when moved in orthagonal directions, including a direction of the viewfinder optical axis and a direction normal to the viewfinder optical axis.

3. The viewfinder of claim 1, said parallax error compensating and diopter adjusting lens group having a positive power.

4. The viewfinder of claim 3, said guide being inclined with respect to said optical axis of the finder so as to move said parallax error compensating and diopter adjusting lens group from a reference position in directions towards and away from said object, and towards and away from said optical axis of the photographing optical system.

5. The camera viewfinder of claim 4, said movement control system moving said parallax error compensating and diopter adjusting lens group towards said object and said optical axis of the photographing optical system when said object distance is shorter than a distance to said reference position, said movement control system moving said parallax error compensating and diopter adjusting lens group away from said object and said optical axis of the photographing optical system when said object distance is longer than a distance to said reference position.

6. The viewfinder of claim 1, said parallax error compensating and diopter adjusting lens group having a negative power.

7. The viewfinder of claim 6, said guide being inclined with respect to said optical axis of the finder so as to move said parallax error compensating and diopter adjusting lens group from a reference position in a direction towards said object and away from said optical axis of the photographing optical system, or in a direction away from said object and towards said optical axis of the photographing optical system.

8. The viewfinder of claim 1, further comprising:
   repetitive measuring means for repeatedly actuating said object distance detector at predetermined time intervals; and
   lens driving means for moving said parallax error compensating and diopter adjusting lens group along said guide in a direction to compensate for a parallax error and to adjust a diopter every time said object distance is detected by said object distance detector.

9. The viewfinder of claim 8, further comprising:
   compensation commencing means for actuating said compensating movement for parallax error and for adjusting of the diopter.

10. The viewfinder of claim 9, said repetitive measuring means being actuated by an operation of the compensation commencing means.

11. The viewfinder of claim 10, a main switch of the camera comprising said compensation commencing means.

12. The viewfinder of claim 10, a grip sensor provided on a grip portion of the camera comprising said compensation commencing means.

13. The viewfinder of claim 9, said detection of object distance by said object distance detecting means being carried out by said compensation commencing means, independently of a shutter release button of the camera.

14. A method for compensating for a parallax error and effecting a diopter adjustment of a viewfinder in a camera having a photographing optical system separate from the viewfinder, wherein the viewfinder has a plurality of lens groups, comprising the steps of:
   providing a parallax error compensating and diopter adjusting lens group as one of the plurality of lens groups;
   detecting a distance of an object to be photographed by an object distance detector; and
   moving the parallax error compensating and diopter adjusting lens group, to a plurality of different positions along a path which intersects an optical axis of the viewfinder, so as to move the parallax error compensating and diopter adjusting lens group towards and away from an optical axis of the photographing optical system, in response to a respective object distance detected by the object distance detector to thereby compensate for a parallax error and adjust a diopter, the step of moving comprising moving the parallax error compensating and diopter adjusting lens group towards the object and away from the optical axis of the photographing optical system when the detected object distance is shorter than a distance to a reference position and moving the parallax error compensating and diopter adjusting lens group away from the object and towards the optical axis of the photographing optical system when the detected object distance is longer than a distance to the reference position.

15. The method for compensating for parallax error and effecting a diopter adjustment of a viewfinder in a camera of claim 14, wherein the step of selecting selects the parallax error compensating and diopter adjusting lens group to have a least influence on magnification and aberrations of the plurality of lens groups comprising an optical system of the viewfinder when moved in orthagonal directions, including a direction of the viewfinder optical axis and a direction normal to the viewfinder optical axis.

16. A viewfinder of a camera having a photographing optical system separate from the viewfinder, comprising:
   object distance detecting means for detecting a distance of an object to be photographed;

compensation commencing means for repetitively commencing said detection of object distance by said object distance detecting means during a predetermined time period in association with activation of a camera switch at a predetermined time interval, said camera switch being distinct from a shutter release of the camera;

a parallax error compensating lens group provided on the finder for movement; and movement control means for moving said parallax error compensating lens group in a direction to eliminate a parallax error every time said object distance is detected by said object distance detecting means.

17. A viewfinder of a camera having a photographing optical system separate from the viewfinder, comprising:

object distance detecting means for detecting a distance of an object to be photographed;

compensation commencing means for repetitively commencing said detection of said object distance by said object distance detecting means during a predetermined time period in association with activation of a camera switch at a predetermined time interval, said camera switch being distinct from a shutter release of the camera;

a diopter adjusting lens group provided on the finder for movement; and movement control means for moving said diopter adjusting lens group in a direction to eliminate a deviation of a diopter every time said object distance is detected by said object distance detecting means.

18. The viewfinder of claim 1, said movement control system continuously moving said parallax error compensating and diopter adjusting lens group in response to detected changes in object distance.

19. The method for compensating for parallax error and effecting diopter adjustment of a viewfinder in a camera of claim 14, wherein the step of moving comprises continuously moving the parallax error compensating and diopter adjusting lens group in response to detected changes in object distance.

20. The viewfinder of a camera according to claim 16, said movement control means continuously moving said parallax error compensating lens group.

21. The viewfinder of a camera according to claim 17, said movement control means continuously moving said diopter adjusting lens group.

22. A camera viewfinder having a plurality of lens groups, wherein a photographing optical system of the camera is separate from the viewfinder, comprising:

a parallax error compensating and diopter adjusting lens group being one of said plurality of lens groups, said parallax error compensating and diopter adjusting lens group having a negative power;

a guide for guiding said parallax error compensating and diopter adjusting lens group along a path which intersects an optical axis of the viewfinder so as to move said parallax error compensating and diopter adjusting lens group towards or away from an optical axis of the photographing optical system, said guide being inclined with respect to the optical axis of the viewfinder so as to move said parallax error compensating and diopter adjusting lens group from reference position in a direction towards the object to be photographed and away from the optical axis of the photographing optical system, or in a direction away from the object to be photographed and towards the optical axis of the photographing optical system;

an object distance detector for detecting a distance of an object to be photographed; and a movement control system for moving said parallax error compensating and diopter adjusting lens group, along said guide, to a plurality of positions along said path, in response to object distances detected by said object distance detector, whereby, for all positions of said parallax error compensating and diopter adjusting lens group, a field of view of the viewfinder is always defined by light passing through said parallax error compensating and diopter adjusting lens group, said movement control system moving said parallax error compensating and diopter adjusting lens group towards the object to be photographed and away from the optical axis of the photographing optical system when said object distance detected by said object distance detector is shorter than a distance to said reference position, said movement control system moving said parallax error compensating and diopter adjusting lens group away from the object to be photographed and towards the optical axis of the photographing optical system when said object distance detected by said object distance detector is longer than a distance to said reference position.

23. The camera viewfinder of claim 22, said parallax error compensating and diopter adjusting lens group having a least influence on magnification and aberration of the plurality of lens groups comprising an optical system of the viewfinder when moved in orthagonal directions, including a direction of the viewfinder optical axis direction and a direction normal to the viewfinder optical axis.

24. The camera viewfinder of claim 22, said parallax error compensating and diopter adjusting lens group having a positive power.

25. The camera viewfinder of claim 24, said guide being inclined with respect to the optical axis of the viewfinder so as to move said parallax error compensating and diopter adjusting lens group from a reference position towards and away from the object to be photographed and towards and away from the optical axis of the photographing optical system.

26. The camera viewfinder of claim 25, said movement control system moving said parallax error compensating and diopter adjusting lens group towards the object to be photographed and towards the optical axis of the photographing optical system when said object distance is shorter than a distance to said reference position, said movement control system moving said parallax error compensating and diopter adjusting lens group away from said object to be photographed and away from the optical axis of the photographing optical system when said object distance is longer than a distance to said reference position.

27. The camera viewfinder of claim 22, further comprising:

a repetitive measuring mechanism for repeatedly actuating said object distance detector at predetermined time intervals; and a lens drive mechanism for providing movement of said parallax error compensating and diopter adjusting lens group along said guide in a direction to compensate for a parallax error and to adjust a diopter every time said object distance is detected by said object distance detector.

28. The camera viewfinder of claim 27, further comprising:

a compensation commencer for commencing said compensation movement to compensate for parallax error and for adjusting the diopter.

29. The camera viewfinder of claim 28, said repetitive measuring mechanism being actuated by an operation of said compensation commencer.

30. The camera viewfinder of claim 29, a main switch of the camera comprising said compensation commencer.

31. The camera viewfinder of claim 29, a grip sensor provided on a grip portion of the camera comprising said compensation commencer.

32. The camera viewfinder of claim 28, detection of object distance by said object distance detector being carried out by said compensation commencer independently of a shutter release button of the camera.

33. A method for compensating for a parallax error and effecting a diopter adjustment of a viewfinder in a camera having a photographing optical system separate from the viewfinder, wherein the viewfinder has a plurality of lens groups, comprising the steps of:

providing a parallax error compensating and diopter adjusting lens group as one of the plurality of lens groups;

detecting a distance of an object to be photographed by an object distance detector; and moving the parallax error compensating and diopter adjusting lens group in accordance with an object distance detected, in a direction intersecting the optical axis of the viewfinder and towards and away from an optical axis of the photographing optical system to compensate for a parallax error and to adjust a diopter, whereby, for all positions of the parallax error compensating and diopter adjusting lens group, a field of view of the viewfinder is always defined by light passing through the parallax error compensating and diopter adjusting lens group, wherein the step of moving comprises moving the parallax error compensating and diopter adjusting lens group towards the object to be photographed and away from the optical axis of the photographing optical system when the detected object distance is shorter than a distance to a reference position, and moving the parallax error compensating and diopter adjusting lens group away from the object to be photographed and towards the optical axis of the photographing optical system when the detected object distance is longer than a distance to the reference position.

34. The method for compensating according to claim 33, wherein the step of selecting selects the parallax error compensating and diopter adjusting lens group to have a least influence on a magnification and aberrations of the plurality of lens groups comprising an optical system of the viewfinder when moved in orthagonal directions, including a direction optical axis of the viewfinder and a direction normal to the viewfinder optical axis.

35. A viewfinder of a camera having a photographing optical system according to claim 17, said compensation commencing means comprising means for commencing detection of the object distance in an absence of activation of said shutter release of said camera.

36. The viewfinder of a camera having a photographing optical system according to claim 17, said movement control means comprising means for moving said parallax error compensating lens group in an absence of activation of said shutter release of said camera.

37. The viewfinder of a camera according to claim 17, said camera switch comprising a main camera switch.

38. A viewfinder of a camera having a photographing optical system according to claim 17, said compensation commencing means comprising means for commencing detection of the object distance in an absence of activation of said shutter release of said camera.

39. The viewfinder of a camera having a photographing optical system according to claim 17, said movement control means comprising means for moving said diopter adjusting lens group in an absence of activation of said shutter release of said camera.

40. The viewfinder of a camera according to claim 17, said camera switch comprising a main camera switch.

\* \* \* \* \*

UNITED STATES PATENT AND TRADEMARK OFFICE
CERTIFICATE OF CORRECTION

PATENT NO. : 5,692,227
DATED : November 25, 1997
INVENTOR(S) : Hidetaka YOKOTA et al.

It is certified that error appears in the above-identified patent and that said Letters Patent is hereby corrected as shown below:

At column 18, line 15 (claim 35, line 2), change "17" to ---16---.

At column 18, line 20 (claim 36, line 2), change "17" to ---16---.

At column 18, line 24 (claim 37, line 1), change "17" to ---16---.

Signed and Sealed this

Twenty-seventh Day of October, 1998

Attest:

BRUCE LEHMAN

Attesting Officer

Commissioner of Patents and Trademarks